United States Patent
Albert et al.

(10) Patent No.: US 11,782,779 B2
(45) Date of Patent: Oct. 10, 2023

(54) TECHNIQUES FOR ERROR CORRECTION OF A LOGICAL QUBIT AND RELATED SYSTEMS AND METHODS

(71) Applicant: Yale University, New Haven, CT (US)

(72) Inventors: Victor V. Albert, New Haven, CT (US); Shantanu Mundhada, New Haven, CT (US); Alexander Grimm, New Haven, CT (US); Steven Touzard, New Haven, CT (US); Michel Devoret, New Haven, CT (US); Liang Jiang, Guilford, CT (US)

(73) Assignee: Yale University, New Haven, CT (US)

( * ) Notice: Subject to any disclaimer, the term of this patent is extended or adjusted under 35 U.S.C. 154(b) by 380 days.

(21) Appl. No.: 16/959,209

(22) PCT Filed: Jan. 5, 2019

(86) PCT No.: PCT/US2019/012438
§ 371 (c)(1),
(2) Date: Jun. 30, 2020

(87) PCT Pub. No.: WO2019/164591
PCT Pub. Date: Aug. 29, 2019

(65) Prior Publication Data
US 2020/0334101 A1    Oct. 22, 2020

Related U.S. Application Data

(60) Provisional application No. 62/613,956, filed on Jan. 5, 2018.

(51) Int. Cl.
*G06F 11/07* (2006.01)
*G06N 10/00* (2022.01)
*G06N 10/70* (2022.01)

(52) U.S. Cl.
CPC ...... *G06F 11/0751* (2013.01); *G06F 11/0736* (2013.01); *G06N 10/00* (2019.01); *G06N 10/70* (2022.01)

(58) Field of Classification Search
CPC . G06F 11/0751; G06F 11/0736; G06N 10/00; G06N 10/40
See application file for complete search history.

(56) References Cited

U.S. PATENT DOCUMENTS 6,128,764 A    10/2000  Gottesman
7,498,832 B2   3/2009   Baumgardner et al.
(Continued)

FOREIGN PATENT DOCUMENTS

CN    102498496 A    6/2012
CN    104881268 A    9/2015
(Continued)

OTHER PUBLICATIONS

Mundhada et al./ "Generating higher order quantum dissipation from lower order parametric processes," hararXiv: 1612.04341v1 [quant-ph] Dec. 13, 2016 (Year: 2016).*
(Continued)

*Primary Examiner* — Matthew L Reames
(74) *Attorney, Agent, or Firm* — Wolf, Greenfield & Sacks, P.C.

(57) ABSTRACT

Techniques for quantum error correction of a multi-level system are provided and described. In some aspects, techniques for encoding a state of a multi-level quantum system include encoding a quantum information in a two-mode state of two quantum mechanical oscillators. Techniques for protecting the two-mode state against dephasing and energy loss are described.

20 Claims, 12 Drawing Sheets

(56) References Cited

U.S. PATENT DOCUMENTS

| | | | |
|---|---|---|---|
| 8,242,799 | B2 | 8/2012 | Pesetski et al. |
| 8,294,138 | B2 | 10/2012 | Farinelli et al. |
| 8,508,280 | B2 | 8/2013 | Naaman et al. |
| 9,152,924 | B2 | 10/2015 | Bonderson et al. |
| 11,037,068 | B2 | 6/2021 | Girvin et al. |
| 2010/0295598 | A1 | 11/2010 | Darabi et al. |
| 2014/0059099 | A1 | 2/2014 | Liberty et al. |
| 2014/0365843 | A1 | 12/2014 | Ashikhmin |
| 2016/0233965 | A1 | 8/2016 | Medford |
| 2016/0254646 | A1 | 9/2016 | Li et al. |
| 2017/0104493 | A1 | 4/2017 | Goto |
| 2019/0020346 | A1 | 1/2019 | Wang et al. |
| 2020/0242500 | A1 | 7/2020 | Girvin et al. |
| 2022/0190933 | A1 | 6/2022 | Noh et al. |

FOREIGN PATENT DOCUMENTS

| | | |
|---|---|---|
| JP | 2014-090341 A | 5/2014 |
| JP | 2015-534410 A | 11/2015 |
| WO | WO 2016/138378 | 9/2016 |
| WO | WO 2017/065856 | 4/2017 |
| WO | WO 2017/139683 | 8/2017 |
| WO | WO 2018/089850 A1 | 5/2018 |
| WO | WO 2020/198581 A1 | 10/2020 |

OTHER PUBLICATIONS

Chen et al. A Schrondinger Cat Living in Two Boxes, arXiv:1601.05505v1 [quant-ph] Jan. 21, 2016 (Year: 2016).*
EP19756883.5, Aug. 6, 2021, Extended European Search Report.
U.S. Appl. No. 15/781,233, filed Jun. 4, 2018, Girvin et al.
EP16892925.5, Jun. 28, 2019, Extended European Search Report.
PCT/US2016/064609, Jul. 31, 2017, Inerntaional Search Report and Written Opinion.
PCT/US2016/0640609, Jun. 14, 2018, International Preliminary Report on Patentability.
PCT/US2019/012438, Aug. 12, 2019, International Search Report and Written Opinion.
PCT/US2019/012438, Jul. 16, 2020, Internation Preliminary Report and Patentability.
Extended European Search Report for European Application No. 19756883.5, dated Aug. 6, 2021.
Chen, Study of De-coherence of Coupled Systems of Charge Qubits and Nonlinear Nanomechanical Resonators. China Master's Thesis Full-Text Database (Basic Sciences Volume). Mar. 15, 2014;3:1-48.
Chiorescu et al., Coherent dynamics of a flux qubit coupled to a harmonic oscillator. Nature. Sep. 2004;431(7005):159-62.
Dong, The q-Deformed Superposition States and Their Properties. Acta Optica Sinica. 1999;19(11):1452-8.
Wang et al., A Schrodinger cat living in two boxes. Science. May 27, 2016;352(6289):1087-91.
U.S. Appl. No. 15/781,233, Girvin et al., filed Jun. 4, 2018.
International Search Report and Written Opinion for International Application No. PCT/US2016/064609 dated Jul. 31, 2017.
International Preliminary Report on Patentability for International Application No. PCT/US2016/064609 dated Jun. 14, 2018.
Extended European Search Report for European Application No. 16892925.5, dated Jun. 28, 2019.
International Search Report and Written Opinion for International Application No. PCT/US2019/012438, dated Aug. 12, 2019.
International Preliminary Report on Patentability for International Application No. PCT/US2019/012438, dated Jul. 16, 2020.
Agarwal et al., Generation of pair coherent states and squeezing via the competition of four-wave mixing and amplified spontaneous emission. Physical review letters. Aug. 18, 1986;57(7):827.
Albert, Lindbladians with multiple steady states: theory and applications. Yale University Dissertation. May 2017, 134 pages.
Albert, Proposal for a Logical Qubit Encoded into a Stabilized Manifold in Two Bosonic Modes. APS March Meeting 2018. Abstract ID V33.007, 1 page.
Andrews et al., Bidirectional and efficient conversion between microwave and optical light. Nature Physics. Apr. 2014;10(4):321-6.
Aoki et al., Quantum error correction beyond qubits. Nature Physics. Aug. 2009;5(8):541-6.
Barends et al., Coherent Josephson qubit suitable for scalable quantum integrated circuits. Physical review letters. Aug. 22, 2013;111(8):080502.
Barends et al., Superconducting quantum circuits at the surface code threshold for fault tolerance. Nature. Apr. 2014;508(7497):500-3.
Barut et al., New "coherent" states associated with non-compact groups. Communications in Mathematical Physics. Mar. 1, 1971;21():41-55.
Bennet et al., Mixed-state entanglement and quantum error correction. Physical Review A. Nov. 1, 1996;54(5):3824-51.
Bény et al., General conditions for approximate quantum error correction and near-optimal recovery channels. Physical review letters. Mar. 23, 2010;104(12): 120501.
Bény, Perturbative quantum error correction. Physical review letters. Aug. 16, 2011;107(8):080501.
Bertet et al., Direct measurement of the Wigner function of a one-photon Fock state in a cavity. Physical Review Letters. Oct. 28, 2002;89(20):200402.
Børkje et al., Observability of radiation-pressure shot noise in optomechanical systems. Physical Review A. Jul. 15, 2010;82(1):013818.
Børkje et al., Signatures of nonlinear cavity optomechanics in the weak coupling regime. Physical review letters. Aug. 2, 2013;111(5):053603.
Boulant et al., Experimental implementation of a concatenated quantum error-correcting code. Physical review letters. Apr. 8, 2005;94(13):130501.
Bradley et al., Microwave cavity searches for dark-matter axions. Reviews of Modem Physics. Jun. 12, 2003;75(3):777-817.
Braunstein et al., Quantum information with continuous variables. Reviews of Modem Physics. Jun. 29, 2005;77(2):513-77.
Braunstein, Error Correction for Continuous Quantum Variables. Phys. Rev. Lett. May 4, 1998;80(18):4084-7.
Brecht et al., Multilayer micro wave integrated quantum circuits for scalable quantum computing. NPJ Quantum Information. Feb. 23, 2016;2:16002.
Chembo et al., Modal expansion approach to optical-frequency-comb generation with monolithic whispering-gallery-mode resonators. Physical Review A. Sep. 7, 2010;82(3):033801.
Chembo et al., Spatiotemporal Lugiato-Lefever formalism for Kerr-comb generation in whispering-gallery-mode resonators. Physical Review A. May 31, 2013;87(5):053852.
Chiaverini et al., Realization of quantum error correction. Nature. Dec. 2004;432(7017):602-5.
Chuang et al., Bosonic quantum codes for amplitude damping. Physical Review A. Aug. 1, 1997;56(2):1114.
Cirac et al., Enforcing coherent evolution in dissipative quantum dynamics. Science. Aug. 30, 1996;273(5279):1207-10.
Cirac et al., Quantum state transfer and entanglement distribution among distant nodes in a quantum network. Physical Review Letters. Apr. 21, 1997;78(16):3221-4.
Clerk et al., Introduction to quantum noise, measurement, and amplification. Reviews of Modem Physics. Apr. 15, 2010;82(2):1155-208.
Coen et al., Modeling of octave-spanning Kerr frequency combs using a generalized mean-field Lugiato-Lefever model. Optics letters. Jan. 1, 2013;38(1):37-9.
Córcoles et al., Demonstration of a quantum error detection code using a square lattice of four superconducting qubits. Nature communications. Apr. 29, 2015;6:6979.
Cory et al., Experimental quantum error correction. Physical Review Letters. Sep. 7, 1998;81(10):2152-5.
Crépeau et al., Approximate quantum error-correcting codes and secret sharing schemes. Advances in Cryptology: Lecture Notes in Computer Science. 2005;3494:285-301.
Devoret et al., Superconducting circuits for quantum information: an outlook. Science. Mar. 8, 2013;339(6124):1169-74.

(56) References Cited

OTHER PUBLICATIONS

Fletcher et al., Optimum quantum error recovery using semidefinite programming. Physical Review A. Jan. 31, 2007;75(1):012338.
Flurin et al., Superconducting quantum node for entanglement and storage of micro wave radiation. Physical review letters. Mar. 4, 2015;114(9):090503.
Frattini et al., 3-wave mixing Josephson dipole element. Applied Physics Letters. May 29, 2017;110(22):222603.
Gao et al., Noise properties of superconducting coplanar waveguide microwave resonators. Applied Physics Letters. Mar. 5, 2007;90(10):102507.
Girvin, Basic concepts in quantum information. Strong Light-Matter Coupling: From Atoms to Solid-State Systems. 2013:155-206.
Girvin, Wiring Up Quantum Systems: Circuit QED with Artificial Atoms and Microwave Photons. Conference on Coherence and Quantum Optics. Jun. 1, 20137:M4B-1.
Gottesman et al., Encoding a qubit in an oscillator. Physical Review A. Jun. 1, 20011;64(1):012310.
Gottesman, An introduction to quantum error correction and fault-tolerant quantum computation. Quantum information science and its contributions to mathematics, Proceedings of Symposia in Applied Mathematics Apr. 2010;68:13-58.
Grassl et al., Quantum error-correcting codes for qudit amplitude damping. IEEE Transactions on Information Theory. Jun. 2018;64(6):4674-85.
Hachohen-Gourgy et al.. Cooling and autonomous feedback in a bose-hubbard chain with attractive interactions. Physical review letters. Dec. 9, 2015;115(24):240501.
Hafezi et al., Chemical potential for light by parametric coupling. Physical Review B. Nov. 15, 2015;92(17):174305.
Hatridge et al., Quantum back-action of an individual variable-strength measurement. Science. Jan. 11, 2013;339(6116):178-81.
Heeres et al., Cavity state manipulation using photon-number selective phase gates. Physical review letters. Sep. 22, 2015;115(13):137002.
Helmer et al., Quantum nondemolition photon detection in circuit QED and the quantum Zeno effect. Physical Review A. May 20, 2009;79(5):052115.
Hofheinz et al., Synthesizing arbitrary quantum states in a superconducting resonator. Nature. May 2009;459(7246):546.
Home et al., Complete methods set for scalable ion trap quantum information processing. Science. Sep. 4, 2009;325(5945):1227-30.
Houck et al., Generating single microwave photons in a circuit. Nature. Sep. 2007;449(7160):328-31.
Ince et al., The case for open computer programs. Nature. Feb. 2012;482(7386):485-8.
Kelly et al., State preservation by repetitive error detection in a superconducting quantum circuit. Nature. Mar. 2015;519(7541):66.
Kirchmair et al., Observation of quantum state collapse and revival due to the single-photon Kerr effect. Nature. Mar. 2013;495(7440):205-9.
Knill et al., Theory of quantum error-correcting codes. Physical Review A. Feb. 1, 1997;55(2):900.
Koch et al., Charge-insensitive qubit design derived from the Cooper pair box. Physical Review A. Oct. 12, 2007;76(4):042319.
Korotkov, Flying microwave qubits with nearly perfect transfer efficiency. Physical Review B. Jul. 25, 2011;84(1):014510.
Krastanov et al., Universal control of an oscillator with dispersive coupling to a qubit. Physical Review A. Oct. 21, 2015;92(4):040303.
Laflamme et al., Perfect quantum error correcting code. Physical Review Letters. Jul. 1, 1996;77(1):198-201.
Lamont et al., Route to stabilized ultrabroadband microresonator-based frequency combs. Optics letters. Sep. 15, 2013;38(18):3478-81.
Lamoreaux et al., Analysis of single-photon and linear amplifier detectors for microwave cavity dark matter axion searches. Physical Review D. Aug. 23, 2013;88(3):035020.
Lassen et al., Quantum optical coherence can survive photon losses using a continuous-variable quantum erasure-correcting code. Nature Photonics. Qct. 2010;4(10):700-5.
Leghtas et al., Confining the state of light to a quantum manifold by engineered two-photon loss. Science. Feb. 20, 2015;347(6224):853-7.
Leghtas et al., Hardware-efficient autonomous quantum memory protection. Physical Review Letters. Sep. 20, 2013;111(12):120501.
Leghtas et al., Stabilizing a Bell state of two superconducting qubits by dissipation engineering. Physical Review A. Aug. 27, 2013;88(2):023849.
Leung et al., Approximate quantum error correction can lead to better codes. Physical Review A. Oct. 1, 1997;56(4):2567-73.
Lidar et al., Decoherence-free subspaces for quantum computation. Physical Review Letters. Sep. 21, 1998;81(12):2594.
Lloyd et al., Analog quantum error correction. Physical Review Letters. May 4, 1998;80(18):4088-91.
Mabuchi et al., Inversion of quantum jumps in quantum optical systems under continuous observation. Physical review letters. Apr. 22, 1996;76(17):3108-11.
Marquardt et al., Optomechanics. Physics. 2009;2:40.
Marquardt et al., Quantum theory of cavity-assisted sideband cooling of mechanical motion. Physical review letters. Aug. 28, 2007;99(9):093902.
McKay et al., High-contrast qubit interactions using multimode cavity QED. Physical review letters. Feb. 27, 2015;114(8):080501.
Meier et al., Signatures of quantum phase transitions in the dynamic response of fluxonium qubit chains. Physical Review B. Aug. 24, 2015;92(6):064516.
Michael et al., New class of quantum error-correcting codes for a bosonic mode. Physical Review X. Jul. 14, 2016;6(3):031006.
Mirrahimi et al., Dynamically protected cat-qubits: a new paradigm for universal quantum computation. New Journal of Physics. Apr. 22, 2014;16(4):045014.
Morin et al., Shining light into black boxes. Science. Apr. 13, 2012;336(6078):159-60.
Moussa et al., Demonstration of sufficient control for two rounds of quantum error correction in a solid state ensemble quantum information processor. Physical review letters. Oct. 11, 2011;107(16):160501.
Mundhada et al., Generating higher-order quantum dissipation from lower-order parametric processes. Quantum Science and Technology. May 24, 2017;2(2):024005.
Murch et al., Cavity-assisted quantum bath engineering. Physical review letters. Oct. 31, 2012;109(18):183602.
Nakamura et al., Coherent control of macroscopic quantum states in a single-Cooper-pair box. Nature. Apr. 1999;398(6730):786-8.
Nandkishore et al., Many-body localization and thermalization in quantum statistical mechanics. Annu. Rev. Condens. Matter Phys.. Mar. 10, 2015;6(1):15-38.
Ng, Simple approach to approximate quantum error correction based on the transpose channel. Physical Review A. Jun. 28, 2010;81(6):062342.
Nigg et al., Stabilizer quantum error correction toolbox for superconducting qubits. Physical Review Letters. Jun. 14, 2013;110(24):243604.
Nigg et al., Black-box superconducting circuit quantization. Physical Review Letters. Jun. 12, 2012;108(24):240502.
Nigg et al., Quantum computations on a topologically encoded qubit. Science. Jul. 18, 2014;345(6194):302-5.
Niset et al., Experimentally feasible quantum erasure—correcting code for continuous variables. Physical review letters. Sep. 26, 2008;101(13):130503.
Ofek et al., Demonstrating quantum error correction that extends the lifetime of quantum information. arXiv preprint arXiv:1602.04768. Feb. 15, 2016, 44 pages.
Ofek et al., Extending the lifetime of a quantum bit with error correction in superconducting circuits. Nature. Aug. 2016;536(7617):441.
Paik et al., Observation of high coherence in Josephson junction qubits measured in a three-dimensional circuit QED architecture. Physical Review Letters. Dec. 5, 2011;107(24):240501.
Peng, Reproducible research in computational science. Science. Dec. 2, 2011;334(6060):1226-7.

(56) References Cited

OTHER PUBLICATIONS

Plenio et al., Quantum error correction in the presence of spontaneous emission. Physical Review A. Jan. 1, 1997;55(1):67-71.
Reagor et al., Quantum memory with near-millisecond coherence in circuit QED. Phys Rev B. 2016;94:014506.
Reagor et al., Reaching 10 ms single photon lifetimes for superconducting aluminum cavities. Applied Physics Letters. May 13, 2013;102(19):192604.
Reed et al., Realization of three-qubit quantum error correction with superconducting circuits. Nature. Feb. 2012;482(7385):382-5.
Rigetti et al., Superconducting qubit in a waveguide cavity with a coherence time approaching 0.1 ms. Physical Review B. Sep. 24, 2012;86(10):100506.
Riste et al., Detecting bit-flip errors in a logical qubit using stabilizer measurements. Nature Communications. Apr. 29, 2015;6:6983.
Romero et al., Microwave photon detector in circuit QED. Physical review letters. Apr. 29, 2009;102(17):173602.
Sayrin et al., Real-time quantum feedback prepares and stabilizes photon number states. Nature. Sep. 2011;477(7362):73-7.
Schindler et al., Experimental repetitive quantum error correction. Science. May 27, 2011;332(6033):1059-61.
Schoelkopf et al., Wiring up quantum systems. Nature. Feb. 6, 2008;451(7179):664-9.
Schuster et al., Resolving photon number states in a superconducting circuit. Nature. Feb. 2007;445(7127):515-18.
Sete et al., Robust quantum state transfer using tunable couplers. Physical Review B. Apr. 22, 2015;91(14):144509.
Shankar et al., Autonomously stabilized entanglement between two superconducting quantum bits. Nature. Dec. 2013;504(7480):419.
Shor, Scheme for reducing decoherence in quantum computer memory. Physical review A. Oct. 1, 1995;52(4):R2493-6.
Silveri et al., New class of photonic quantum error correction codes. APS March Meeting 2016, Abstract ID K44.005, 1 page.
Silveri et al., Theory of remote entanglement via quantum-limited phase-pre serving amplification. Physical Review A. Jun. 7, 2016;93(6):062310.
Smith et al., Many-body localization in a quantum simulator with programmable random disorder. Nature Physics. Qct. 2016;12(10):907-10.
Srinivasan et al., Time-reversal symmetrization of spontaneous emission for quantum state transfer. Physical Review A. Mar. 31, 2014;89(3):033857.
Srinivasan et al., Tunable coupling in circuit quantum electrodynamics using a superconducting charge qubit with a V-shaped energy level diagram. Physical review letters. Feb. 22, 2011;106(8):083601.
Steane, Error correcting codes in quantum theory. Physical Review Letters. Jul. 29, 1996;77(5):793-7.
Sun et al., Tracking photon jumps with repeated quantum nondemolition parity measurements. Nature. Jul. 2014;511(7510):444-8.
Sundaresan et al., Beyond strong coupling in a multimode cavity. Physical Review X. Jun. 29, 2015;5(2):021035.
Taminiau et al., Universal control and error correction in multi-qubit spin registers in diamond. Nature nanotechnology. Mar. 2014;9(3):171-6.
Terhal et al., Encoding a qubit into a cavity mode in circuit QED using phase estimation. Physical Review A. Jan. 11, 2016;93(1):012315.
Terhal, Quantum error correction for quantum memories. Reviews of Modem Physics. Apr. 7, 2015;87(2):307-46.
Underwood et al., Measurement of the motional sidebands of a nanogram-scale oscillator in the quantum regime. Physical Review A. Dec. 2, 2015;92(6):061801.
Vlastakis et al., Deterministically encoding quantum information using 100-photon Schrödinger cat states. Science. Nov. 1, 2013;342(6158):607-10.
Vlastakis et al., Violating Bell's inequality with an artificial atom and a cat state in a cavity. arXiv preprint arXiv:1504.02512. Apr. 9, 2015.
Waldherr et al., Quantum error correction in a solid-state hybrid spin register. Nature. Feb. 2014;506(7487):204-7.
Wenner et al., Catching time-reversed microwave coherent state photons with 99.4% absorption efficiency. Physical Review Letters. May 28, 2014;112(21):210501.
Wilson-Rae et al., Theory of ground state cooling of a mechanical oscillator using dynamical backaction. Physical Review Letters. Aug. 28, 2007;99(9):093901.
Yin et al., Catch and release of microwave photon states. Physical review letters. Mar. 4, 2013;110(10):107001.
Yurke et al., SU (2) and SU (1, 1) interferometers. Physical Review A. Jun. 1, 1986;33(6):4033-54.
Yurke et al., The dynamic generation of Schrodinger cats and their detection. Physica B. Jul. 1, 1988;151(1-2):298-301.
Zanardi et al., Noiseless quantum codes. Physical Review Letters. Oct. 27, 1997;79(17):3306.
Zhang et al., Experimental implementation of encoded logical qubit operations in a perfect quantum error correcting code. Physical review letters. Sep. 6, 2012;109(10):100503.
Zheng et al., Demonstrating non-Abelian statistics of Majorana fermions using twist defects. Physical Review B. Dec. 31, 2015;92(24):245139.
Zueco et al., Qubit-oscillator dynamics in the dispersive regime: analytical theory beyond rotating-wave approximation. Physical Review A. 2009;80:033846.
U.S. Appl. No. 17/598,148, filed Sep. 24, 2021, Noh et al.
PCT/US2020/025204, Jun. 23, 2020, International Search Report and Written Opinion.
PCT/US2020/025204, Oct. 7, 2021, International Preliminary Report on Patentability.
EP20776963.9, Nov. 25, 2022, Extended European Search Report.
PCT/US2022/053675, Apr. 6, 2023, International Search Report and Written Opinion.
Kitaev, Quantum error correction with imperfect gates. Quantum Communication, Computing, and Measurement. Jul. 1997;181-8.
Shapiro et al., Optical communication with two-photon coherent states-part II: Photoemissive detection and structured receiver performance. IEEE Transactions on Information Theory. Mar. 1979;25(2):179-92.
Zak, Finite translations in solid-state physics. Physical Review Letters. Dec. 11, 1967;19(24):1385.
International Search Report and Written Opinion in International Application No. PCT/US2020/025204, dated Jun. 23, 2020.
International Preliminary Report on Patentability in International Application No. PCT/US2020/025204, dated Oct. 7, 2021.
Extended European Search Report for European Application No. 20776963.9, dated Nov. 25, 2022.
International Search Report and Written Opinion for International Application No. PCT/US2022/053675, dated Apr. 6, 2023.
Aaronson et al., BosonSampling with lost photons. Phys. Rev. A. Jan. 21, 2016; 93:012335.
Aaronson et al., The computational complexity of linear optics. Proceedings of the 43rd Annual ACM Symposium on Theory of Computing, STOC. Jun. 2011; 333-42.
Albert et al., Performance and structure of single-mode bosonic codes. Physical Review A. Mar. 30, 2018;97(3):032346.
Arrazola et al., Machine learning method for state preparation and gate synthesis on photonic quantum computers. Quantum Science and Technology. Jan. 22, 2019;4:024004.
Baragiola et al., All-Gaussian universality and fault tolerance with the Gottesman-Kitaev-Preskill code. Physical review letters. Nov. 13, 2019;123(20):200502.
Bergmann et al., Quantum error correction against photon loss using NOON states. Phys. Rev. A. Jul. 7, 2016; 94:012311. https://doi.org/10.1103/PhysRevA.94.012311.
Braunstein Quantum error correction for communication with linear optics. Nature. Jul. 2, 1998; 394:47-9.
Cai et al., Bosonic quantum error correction codes in superconducting quantum circuits. Fundamental Research. Jan. ,1 2021;1(1):50-67.
Campagne-Ibarq et al., Quantum error correction of a qubit encoded in grid states of an oscillator. Nature. Aug. 20, 2020;584(7821):368-72.

(56) References Cited

OTHER PUBLICATIONS

Cochrane et al., Macroscopically distinct quantum-superposition states as a bosonic code for amplitude damping. Phys. Rev. 23 A. Apr. 1, 1999;59(4):2631-4. arXiv.quant-ph/9809037v2.
De Neeve et al., Error correction of a logical grid state qubit by dissipative pumping. Nature Physics. Mar. 2022;18(3):296-300.
Duivenvoorden et al., Single-mode displacement sensor. Physical Review A. Jan. 5, 2017;95(1):012305. arXiv:1603.02242v4 [quant-ph].
Eaton et al., Gottesman-Kitaev-Preskill State Preparation by Photon Catalysis. New Journal of Physics. Nov. 18, 2019;21:113034.
Eisert et al. Distilling Gaussian states with Gaussian operations is impossible. Phys. Rev. Lett. Sep. 4, 2002;89:137903. https://doi.org/10.1103/PhysRevLett.89.137903.
Faist et al., Continuous symmetries and approximate quantum error correction. Phys. Rev. X. Oct. 26, 2020;10:041018. arXiv:1902.07714v1 [quant-ph].
Flühmann et al., Direct characteristic-function tomography of quantum states of the trapped-ion motional oscillator. Physical Review Letters. Jul. 21, 2020;125(4):043602.
Flühmann et al., Encoding a qubit in a trapped-ion mechanical oscillator. Nature. Feb. 27, 2019;566:513-7.
Flühmann et al., Sequential modular position and momentum measurements of a trapped ion mechanical oscillator. Phys. Rev. X. Apr. 2, 2018; 8:021001.
Fowler Surface codes: Towards practical large-scale quantum computation. Phys. Rev. A. Sep. 18, 2012; 86(032324): 48 pages.
Fukui et al., Analog quantum error correction with encoding a qubit into an oscillator. Phys. Rev. Lett. Nov. 10, 2017; 119:180507.
Gottesman Stabilizer codes and quantum error correction. Ph.D. Thesis, California Institute of Technology. May 21, 1997; 122 pages.
Harrington et al., Achievable rates for the Gaussian quantum channel. Phys. Rev. A. May 17, 2001;64:062301. https://doi.org/10.1103/PhysRevA.64.062301.
Hayden et al., Error Correction of Quantum Reference Frame Information. PRX Quantum. Feb. 18, 2021;2:010326. arXiv:1709.04471v1 [quant-ph].
Hayden et al., Spacetime replication of continuous variable quantum information. New J. Phys. Aug. 24, 2016;18(8):083043.
Holevo One-mode quantum Gaussian channels: Structure and quantum capacity. Problems of Information Transmission. Mar. 2007;43(1):1-11.
Hu et al., Demonstration of quantum error correction and universal gate set operation on a binomial bosonic logical qubit. Nature Physics. Feb. 11, 2019; 15:503-8.
Huh et al., Boson sampling for molecular vibronic spectra. Nature Photonics. Aug. 24, 2015;9:615-20.
Kienzler et al., Quantum harmonic oscillator state synthesis by reservoir engineering. Science. Jan. 2, 2015;347(6217):53-6.
Knill et al. A scheme for efficient quantum computation with linear optics. Nature, Jan. 4, 2001;409(6816):46-52.
Lloyd et al., Quantum computation over continuous variables. Phys. Rev. Lett. Feb. 22, 1999;82(8):1784 7.
Motes et al., Encoding qubits into oscillators with atomic emsembles and squeezed light. Phys. Rev. A. May 8, 2017;95(5):053819.
Nielsen et al., Quantum Computation and Quantum Information. Cambridge Series on Information and the Natural Sciences; Cambridge University Press. First published Oct. 23, 2000; 10th anniversary edition published Dec. 9, 2010:1-676.
Niset et al., No-go theorem for Gaussian quantum error correction. Phys. Rev. Lett. Mar. 24, 2009;102:120501.
Niu et al., Hardware-efficient bosonic quantum error-correcting codes based on symmetry operators. Phys. Rev. A. Mar. 27, 2018;97:032323.
Noh et al., Encoding an oscillator into many oscillators. Phys. Rev. Lett. Aug. 18, 2020;125:080503.
Noh et al., Fault-tolerant bosonic quantum error correction with the surface-Gottesman-Kitaev-Preskill code. Physical Review A. Jan. 13, 2020;101(1):012316.
Noh et al., Quantum capacity bounds of Gaussian thermal loss channels and achievable rates with Gottesman-Kitaev-Preskill codes. IEEE Transactions on Information Theory. Apr. 2019;65(4):2563-82.
Pirandola et al. Constructing finite-dimensional codes with optical continuous variables. Europhys. Lett. Oct. 1, 2004;68(323):0402202.
Pirandola et al. Generating continuous variable quantum codewords in the near-field atomic lithography. Journal of Physics B: Atomic, Molecular and Optical Physics. Feb. 1, 2006;39(4):997.
Royer et al. Stabilization of finite-energy Gottesman-Kitaev-Preskill states. Physical Review Letters. Dec. 31, 2020;125(26):260509.
Royer et al.. Encoding qubits in multimode grid states. PRX Quantum. Mar. 7, 2022;3(1):010335.
Sparrow et al., Simulating the vibrational quantum dynamics of molecules using photonics. Nature. May 2018;557(7707):660-7.
Su et al., Conversion of Gaussian states to non-Gaussian states using photon-No. resolving detectors. Phys. Rev. A. Nov. 1, 2019; 100:052301.
Touzard et al., Coherent oscillations inside a quantum mani-fold stabilized by dissipation. Phys. Rev. X. Apr. 4, 2018; 8:021005 (7 pages).
Touzard et al., Grid states for encoding and stabilizing a logical qubit in superconducting circuits (Part 2). APS March Meeting Abstracts 2019. Mar. 7, 2019:S27-005, 1 page. https://meetings.aps.org/Meeting/MAR19/Session/S27.5.
Travaglione et al. Preparing encoded states in an oscillator. Phys. Rev. A. Nov. 22, 2002;66:052322.
Vasconcelos et al., All-optical generation of states for "encoding a qubit in an oscillator". Opt. Lett. Oct. 1, 2010;35(19):3261-3.
Vuillot et al., Quantum Error Correction with the toric Gottesman-Kitaev-Preskill Code. Phys. Rev. A. Mar. 29, 2019;99:032344. arXiv:1810.00047v2 [quant-ph].
Weedbrook et al., Gaussian quantum information. Rev. Mod. Phys. May 1, 2012;84:621-69.
Weigand et al., Generating Grid States From Schrodinger Cat States Without Postselection. Phys. Rev. A. Feb. 28, 2018;97:022341.

* cited by examiner

TECHNIQUES FOR ERROR CORRECTION OF A LOGICAL QUBIT AND RELATED SYSTEMS AND METHODS

CROSS-REFERENCE TO RELATED APPLICATIONS

This Application is a national stage filing under 35 U.S.C. § 371 of International Patent Application Serial No. PCT/US2019/012438, filed Jan. 5, 2019, which claims priority under 35 U.S.C. 119(e) to U.S. Provisional Application Serial No. 62/613,956, filed Jan. 5, 2018. The entire contents of these applications are incorporated herein by reference in their entirety.

STATEMENT REGARDING FEDERALLY-SPONSORED RESEARCH AND DEVELOPMENT

This invention was made with government support under W911NF-14-1-0011 awarded by the United States Army Research Office and under 1122492 awarded by the National Science Foundation. The government has certain rights in the invention.

BACKGROUND

Quantum information processing techniques perform computation by manipulating one or more quantum objects. These techniques are sometimes referred to as "quantum computing." In order to perform computations, a quantum information processor utilizes quantum objects to reliably store and retrieve information. According to some quantum information processing approaches, a quantum analogue to the classical computing "bit" (being equal to 1 or 0) has been developed, which is referred to as a quantum bit, or "qubit." A qubit can be composed of any quantum system that has two distinct states (which may be thought of as 1 and 0 states), but also has the special property that the system can be placed into quantum superpositions and thereby exist in both of those states at once.

Several different types of qubits have been successfully demonstrated in the laboratory. However, the lifetime of the states of some types of systems before information is lost due to decoherence of the quantum state, or to other quantum noise, may be on the order of ~100 µs. Notwithstanding longer lifetimes, it may be important to provide error correction techniques in quantum computing that enable reliable storage and retrieval of information stored in a quantum system. However, unlike a classical computing system in which bits can be copied for purposes of error correction, the no-cloning theorem precludes the cloning of an unknown state of a quantum system. The system may, however, be entangled with other quantum systems which effectively spreads the information in the system out over several entangled objects.

SUMMARY

According to some aspects, a system is provided comprising a circuit quantum electrodynamics system that includes a logical qubit comprising first and second quantum mechanical oscillators, a mixing circuit coupled to each of the first and second quantum mechanical oscillators, and a quantum error syndrome detection circuit coupled to each of the first and second quantum mechanical oscillators, at least one controller, and at least one computer readable medium storing instructions that, when executed by the at least one controller, perform a method comprising applying, using the at least one controller, a plurality of drive waveforms to the mixing circuit, the plurality of drive waveforms having different frequencies, and concurrent with said application of a plurality of drive waveforms, detecting, by the quantum error syndrome detection circuit, a change in energy state of the logical qubit.

According to some embodiments, the plurality of drive waveforms are configured to drive a dissipation of energy from the first and second quantum mechanical oscillators to the mixing circuit.

According to some embodiments, the mixing circuit is coupled to the first and second quantum mechanical oscillators via a first Josephson junction.

According to some embodiments, the plurality of drive waveforms are configured to produce an exchange of energy between the first and second quantum mechanical oscillators and the first Josephson junction.

According to some embodiments, said exchange of energy is configured to passively protect against dephasing errors of the logical qubit.

According to some embodiments, the first and second quantum mechanical oscillators exhibit different resonant frequencies.

According to some embodiments, the first and second quantum mechanical oscillators each comprise a microwave cavity.

According to some embodiments, the quantum error syndrome detection circuit comprises a fourth quantum mechanical oscillator independently coupled to each of the first and second quantum mechanical oscillators.

According to some embodiments, the quantum error syndrome detection circuit further comprises second and third Josephson junctions, the fourth quantum mechanical oscillator is coupled to the first quantum mechanical oscillator via the second Josephson junction, and the fourth quantum mechanical oscillator is coupled to the second quantum mechanical oscillator via the third Josephson junction.

According to some embodiments, the instructions are further configured to, when executed by the at least one controller, apply first and second pumps to the second and third Josephson junctions, respectively.

According to some embodiments, the instructions are further configured to, when executed by the at least one controller, detect an energy displacement of the fourth quantum mechanical oscillator caused by application of the first and second pumps, wherein said energy displacement is indicative of the change in the energy state of the logical qubit.

According to some embodiments, the quantum error syndrome detection circuit comprises a fourth Josephson junction coupled to each of the first and second quantum mechanical oscillators.

According to some embodiments, the change in the energy state of the logical qubit is implicitly detected via application of one or more drive waveforms to the first quantum mechanical oscillator that produce a change in the energy state of the first quantum mechanical oscillator which is dependent upon a state of the fourth Josephson junction.

According to some aspects, a method of performing quantum error correction is provided within a circuit quantum electrodynamics system that includes a logical qubit comprising first and second quantum mechanical oscillators, a mixing circuit coupled to each of the first and second quantum mechanical oscillators, and quantum error syndrome detection circuit coupled to each of the first and second quantum mechanical oscillators, the method comprising applying, using at least one controller, a plurality of drive waveforms to the mixing circuit, the plurality of drive waveforms having different frequencies, and concurrent with said application of a plurality of drive waveforms, detecting, by the quantum error syndrome detection circuit, a change in energy state of the logical qubit.

According to some embodiments, the plurality of drive waveforms drive a dissipation of energy from the first and second quantum mechanical oscillators to the mixing circuit.

According to some embodiments, the plurality of drive waveforms produce an exchange of energy between the first and second quantum mechanical oscillators and a first Josephson junction, and wherein the mixing circuit is coupled to the first and second quantum mechanical oscillators via the first Josephson junction.

According to some aspects, a circuit quantum electrodynamics system is provided comprising a physical qubit, a logical qubit comprising a first bosonic system and a second bosonic system, the first and second bosonic systems being coupled to the physical qubit, wherein a state of the physical qubit is encoded in a state of the logical qubit that is a multi-component coherent state of the bosonic system, and an error syndrome detector coupled to the logical qubit and configured to detect an error in said state of the logical qubit based on one or more quantum non-destructive measurements of a boson number difference between the first and second bosonic systems.

According to some embodiments, the error syndrome detector comprises a third bosonic system independently coupled to each of the first and second bosonic systems.

According to some embodiments, the error syndrome detector further comprises second and third Josephson junctions, wherein the third bosonic system is coupled to the first bosonic system via the second Josephson junction, and wherein the third bosonic system is coupled to the second bosonic system via the third Josephson junction.

According to some embodiments, the error syndrome detector is further configured to detect an energy displacement of the third bosonic system caused by application of energy to the third bosonic system, wherein said energy displacement is indicative of the boson number difference between the first and second bosonic systems.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
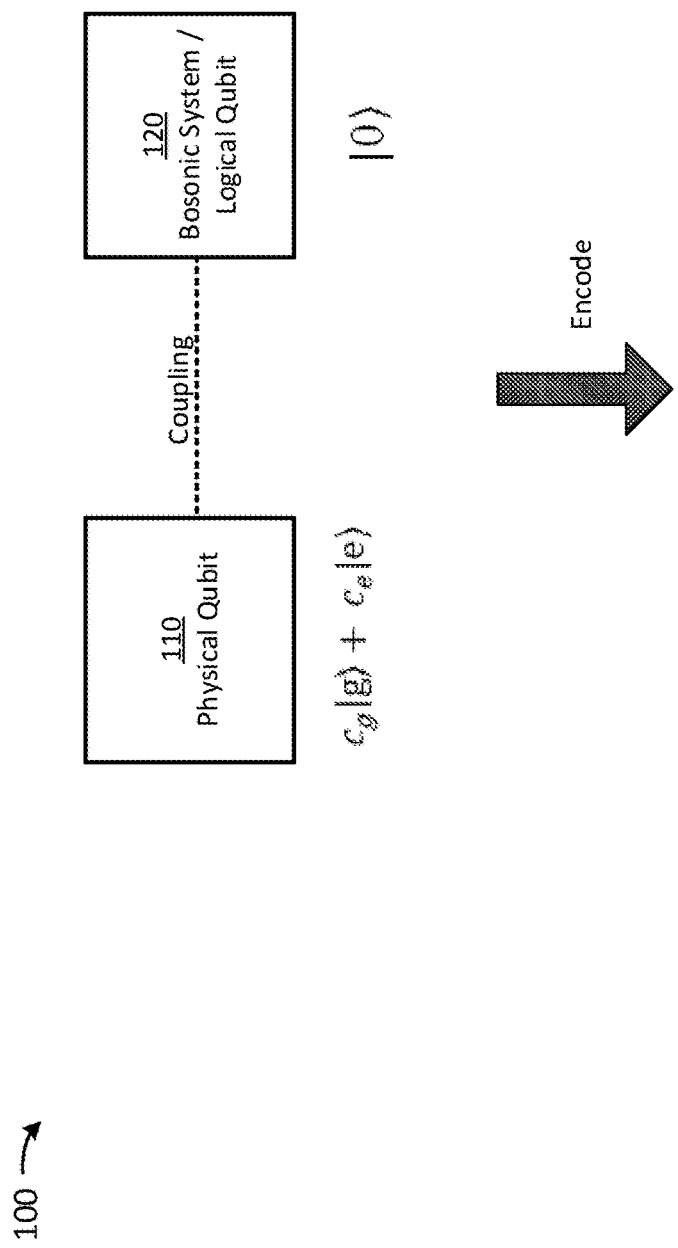
FIGS. 1A-1B illustrate encoding of the state of a multi-level quantum system in a bosonic system, according to some embodiments.

The present application relates to an improved technique for correcting errors in the state of a multi-mode quantum system. An "error" in the quantum error correction context refers to a change in the state of the quantum system that may be caused by, for instance, energy (e.g., photon) losses, energy gains, dephasing, time evolution of the system, etc., and which alters the state of the system such that the information stored in the system is altered.

As discussed above, quantum multi-level systems such as qubits exhibit quantum states that may decohere too quickly for practical quantum computation. While experimental techniques will undoubtedly improve on this and produce qubits with longer decoherence times, it may nonetheless be beneficial to couple a multi-level system to another system that exhibits much longer decoherence times. When the information stored by a qubit is stored within a coupled system, the coupled system is often referred to as a "logical qubit" because it stores information like a qubit though it does so indirectly and not through a single multi-mode state (by way of comparison, the solitary single multi-mode state qubit may be termed a "physical qubit").

As will be described further below, it may be particularly desirable to produce a logical qubit from one or more bosonic modes (e.g., modes of one or more microwave cavities). Generally speaking, a bosonic mode may be electromagnetic, magnetic, or even mechanical oscillator modes, although, in the current context, it is photonic and relates to number states of photons stored in a cavity. While quantum information stored in bosonic modes may have a longer lifetime than a qubit state, the lifetime may still be limited and errors may still occur within the bosonic system. It may therefore be desirable to arrange a bosonic system so that when errors in its state occur, these errors can be effectively corrected and the prior state of the system may thereby be regained. If a broad class of errors can be corrected for, it may be possible to maintain the state of the bosonic system indefinitely (or at least for long periods of time) by correcting for any type of error that might occur.

The fields of cavity quantum electrodynamics (cavity QED) and circuit QED represent one illustrative experimental approach to implement quantum error correction. In these approaches, quantum information may be encoded in the state of a qubit, which may be a physical qubit or a logical qubit.

In some approaches, one or more physical qubits are each coupled to a logical qubit in such a way as to allow mapping of the quantum information contained in the physical qubit to and/or from the logical qubit. The logical qubits generally will have longer stable lifetimes than the physical qubits. The quantum state may later be retrieved in a physical qubit by mapping the state back from a respective logical qubit to the physical qubit.

When a multi-level system, such as a physical qubit, is mapped onto the state of a bosonic system to which it is coupled, a particular way to encode the qubit state in the bosonic system must be selected. This choice of encoding is often referred to simply as a "code."

As an example, a code might represent the ground state of a qubit using the zero boson number state of a resonator and represent the excited state of a qubit using the one boson number state of the resonator. That is:

$$(c_g|g\rangle + c_e|e\rangle) \otimes |0\rangle \to |g\rangle \otimes (c_g|0\rangle + c_h|1\rangle)$$

where $|g\rangle$ is the ground state of the qubit, $|e\rangle$ is the excited state of the qubit, $c_g$ and $c_e$ are complex numbers representing the probability amplitude of the qubit being in state $|g\rangle$ or $|e\rangle$, respectively, and $|0\rangle$ and $|1\rangle$ are the zero boson number state and one boson number state of the resonator, respectively. While this is a perfectly valid code, it fails to be robust against many errors, such as boson loss. That is, when a boson loss occurs, the state of the resonator prior to the boson loss may be unrecoverable with this code.

The use of a code can be written more generally as:

$$(c_g|g\rangle + c_e|e\rangle) \otimes |0\rangle \to |g\rangle \otimes (c_g|W_\downarrow\rangle + c_e|W_\uparrow\rangle)$$

where $\otimes$ signifies a tensor product, the right arrow signifies a code mapping, and $|W_\downarrow\rangle$ and $|W_\uparrow\rangle$ are referred to as the logical codewords (or simply "codewords"). The choice of a code—equivalently, the choice of how to encode the state of a two-level system (e.g., a qubit), representing one bit of quantum information, in the state of the bosonic system—may therefore comprise choosing values for $|W_\downarrow\rangle$ and $|W_{52}\rangle$. FIGS. 1A-1B graphically depict this process of encoding for some choice of $|W_\downarrow\rangle$ and $|W_\uparrow\rangle$.

When an error occurs, the state of the logical qubit transforms to a superposition of resulting states, herein termed "error words," $|E_\downarrow^k\rangle$ and $|E_\uparrow^k\rangle$ as follows:

$$\alpha|W_\downarrow\rangle + \beta|W_\uparrow\rangle \to \alpha|E_\downarrow^k\rangle + \beta|E_\uparrow^k\rangle$$

where the index k refers to a particular error that has occurred. As discussed above, examples of errors include boson loss, boson gain, dephasing, amplitude damping, etc.

In the above example, the logical qubit is used to encode the state of a physical qubit. Alternately, the logical qubit may be used independently to encode a state using a particular code to represent a multi-level system.

Irrespective of whether the state of the logical qubit is encoded based on a coupled physical qubit or as an independent state, an error in the logical qubit may be detected by making one or more measurements of the bosonic system and/or of one or more systems to which the bosonic system is coupled. A particular result of measurements that indicates an error has occurred is often referred to as an "error syndrome." For instance, certain measurements may indicate that the bosonic system has lost a boson. The presence of an error, and in some cases the type of error, indicated by the error syndrome may imply that the system has changed to some new state in such a way that the error words are known. In some cases, the error words may be determined by implication based on the error syndrome. For instance, as discussed below, with conventional cat codes, parity is measured as an error syndrome of boson loss, which allows an operation to be identified that will return the system to its state prior to the loss of the boson.

In general, the choice of code affects how robust the system is to errors. That is, the code used determines to what extent a prior state can be faithfully recovered when an error occurs. A desirable code would be associated with a broad class of errors for which no information is lost when any of the errors occurs and any quantum superposition of the logical codewords can be faithfully recovered. Some codes, while robust against certain errors, may however be impractical to realize in a physical system.

One class of codes, referred to as "cat codes," have a desirable property that the state of a bosonic system storing a bit of quantum information using these codes is robust against boson loss errors. Cat codes are described in Leghtas et al., "Hardware-Efficient Autonomous Quantum Memory Protection," Phys. Rev. Lett., 111(12):120501, 2013, incorporated herein by reference. In particular, the cat codes represent a set of logical codewords that encode a bit of quantum information in such a way that the loss of a boson produces error words that are also part of the same set of codewords. Furthermore, by non-destructively measuring a change in parity of the bosonic system, boson losses can be identified and corrected by transforming the state of the bosonic system back to the state prior to the loss.

In the description below, for purposes of illustration, photon systems such as optical or microwave cavities are discussed, although it will be appreciated that any of the below description that relates to photon systems may equally apply to other suitable bosonic systems and is not limited to the particular systems described.

Using the cat codes, one bit of quantum information (e.g., the state of a physical qubit) may be represented by a multi-component coherent state of a bosonic oscillator:

$$|\psi_\alpha^{(0)}\rangle = c_g|C_\alpha^+\rangle + c_e|C_{i\alpha}^+\rangle$$

where $$|C_\alpha^\pm\rangle = \mathcal{N}(|\alpha\rangle \pm |-\alpha\rangle), |C_{i\alpha}^\pm\rangle = \mathcal{N}(|i\alpha\rangle \pm |-i\alpha\rangle),$$

$\mathcal{N}$ is a normalizing factor and $|\alpha\rangle$ denotes a coherent state of complex amplitude $\alpha$, chosen such that $|\alpha\rangle$, $|-\alpha\rangle$, $|i\alpha\rangle$, $|-i\alpha\rangle$ are quasi-orthogonal. Together with $|\psi_\alpha^{(0)}\rangle$, the following states may also be introduced:

$$|\psi_\alpha^{(1)}\rangle = c_g|C_\alpha^-\rangle + ic_e|C_{i\alpha}^-\rangle$$

$$|\psi_\alpha^{(2)}\rangle = c_g|C_\alpha^+\rangle - c_e|C_{i\alpha}^+\rangle$$

$$|\psi_\alpha^{(3)}\rangle = c_g|C_\alpha^-\rangle - ic_e|C_{i\alpha}^-\rangle$$

These states have useful properties. First, when a boson is lost from the system (a type of error as discussed above), the states $|\psi_\alpha^{(n)}\rangle$ evolve to another one of the states $|\psi_\alpha^{(n)}\rangle$. That is, the set $\{|\psi_\alpha^{(n)}\rangle\}$ is closed under the action of the annihilation operator a. Second, in the absence of boson losses, the state deterministically evolves in a predictable manner. As a result, a unitary transformation can be found that is independent of $c_g$ and $C_e$ and which maps an evolved state that may or may not be the result of a boson loss back to the original state, thereby undoing the effect of decoherence. A boson loss can be identified, for instance, through a quantum non-destructive (QND) measurement of boson number parity.

The inventors have recognized and appreciated that, while cat codes may be robust against the loss of a single boson, these codes are not robust against the simultaneous loss of two bosons. That is, the operator $a^2$ acting on $|\psi_\alpha^{(n)}\rangle$ may produce a state from which the prior state cannot be recovered.

The inventors have further recognized and appreciated techniques for realizing a class of codes, referred to herein as pair-cat codes, that are robust against multiple boson losses. The pair-cat codes described herein encode a bit of quantum information using the combined state of two bosonic systems, and the inventors have realized techniques for correcting errors that may occur as a result of changes in either or both systems. In particular, the techniques comprise a driven-dissipative process that stabilizes the systems' states with respect to dephasing errors, and comprise a process for detecting and correcting any number of non-simultaneous boson-loss errors from either or both systems.

Figure 2:
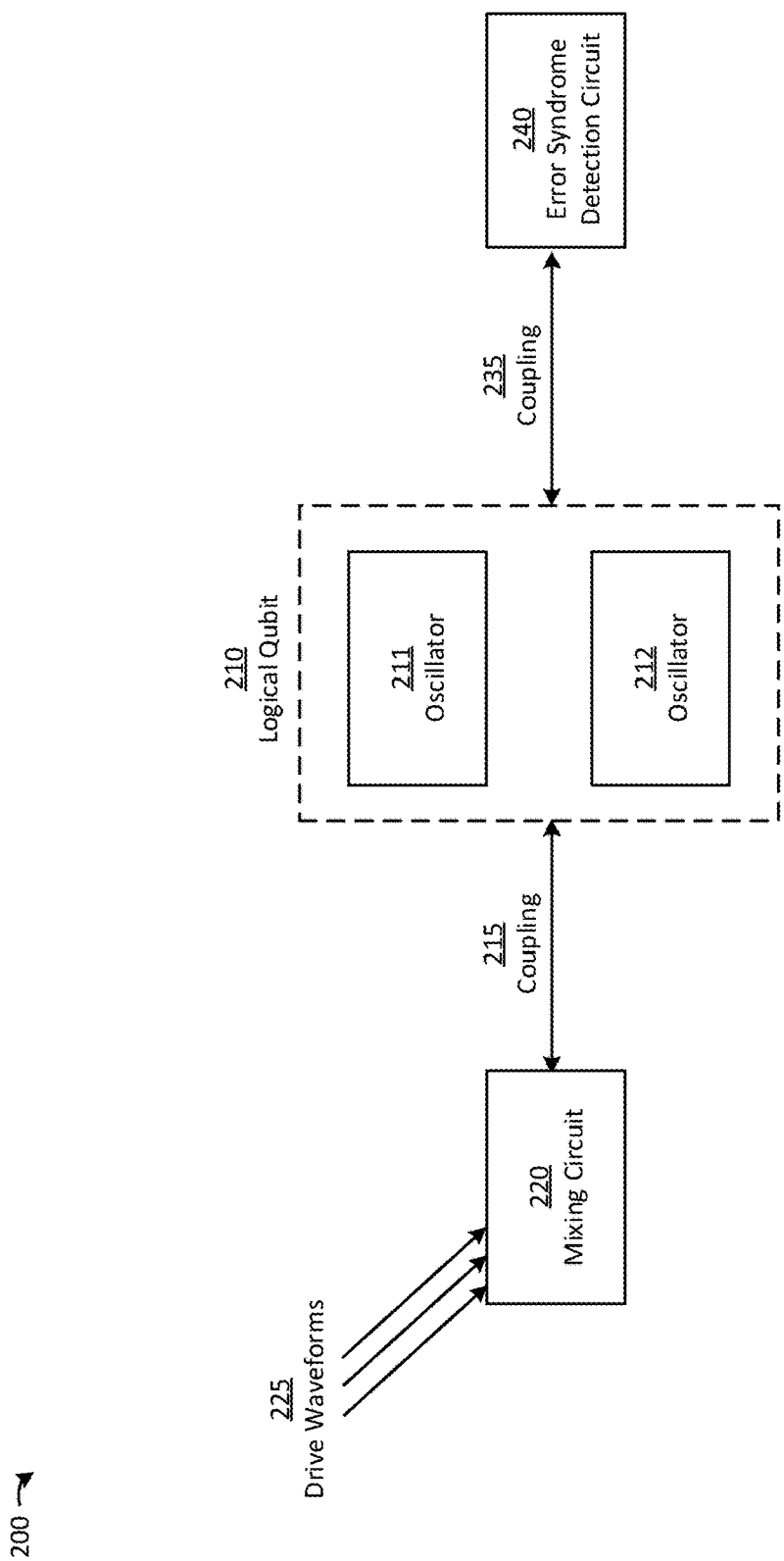
FIG. 2 depicts an illustrative system for encoding a logical qubit in the state of two quantum mechanical oscillators, according to some embodiments.

FIG. 2 depicts an illustrative system for encoding a logical qubit in the state of two quantum mechanical oscillators such that the quantum information encoded by the state may be protected against errors, according to some embodiments. In the example of system 200, oscillators 211 and 212 may be arranged with a two-mode quantum state according to the pair-cat codes, which will be described below. The two-mode state of the oscillators may encode a logical qubit 210 such that the quantum information is robust against dephasing and boson-loss errors. In particular, the mixing circuit 220, through application of drive waveforms 225, allows dissipation of energy from the oscillators 211 and 212 via the coupling 215 in such a way as to protect against dephasing errors in the two-mode state. For instance, the mixing circuit 220 may comprise one or more elements configured to convert the drive waveforms 225 into operations upon the logical qubit 210. In the example of FIG. 2, the error syndrome detection circuit 240 is configured to detect boson losses from either or both oscillators 211 and 212 (i.e., from either or both modes of the two-mode state). In some embodiments, the error syndrome detection circuit 240 may also be configured to perform actions to change a state of the two-mode state of oscillator 211 and oscillator 212 and thereby correct for detected boson-loss errors.

According to some embodiments, system 200 may protect the quantum information encoded by logical qubit 210 through passive protection. Passive protection, as referred to herein, comprises an ongoing process that corrects for one or more errors without it being necessary to measure an error syndrome and determine an appropriate recovery operation based on the measurement. Such processes may also be referred to as continuous quantum error correction (QEC).

In order to describe the manner in which the system of FIG. 2 protects the logical qubit 210 against various errors, the pair-cat codes are explained below. For convenience, photon systems are considered in the below discussion, although, as discussed above, the below discussion may equally be applied to any other bosonic system. Let $\mathcal{D}[F]$ be a dissipator:

$$\mathcal{D}[F](\rho) = F\rho F^\dagger - \tfrac{1}{2}\{F^\dagger F, \rho\}$$

where F is a jump operator and $\rho$ a density matrix. In the conventional cat code approach described above, a stabilizing jump operator $F_I = a^4 - \alpha^4$ is considered, which annihilates all steady states and which commutes with photon number parity.

In the case of the pair-cat codes, the stabilizing jump operator $F_{II} = a^2 b^2 - \gamma^4$ is considered, where in the pair-cat codes the annihilation operators of the two oscillators are a and b and complex parameters $\gamma$ are used to denote the pair-cat states. Each oscillator mode obeys the standard commutation relations $[a, a^\dagger] = [b, b^\dagger] = 1$ and $[a, b^\dagger] = 0$ and photon number operators for each oscillator are denoted $\hat{n} = a^\dagger a$ and $\hat{m} = b^\dagger b$.

Time evolution of the two-mode density matrix $\rho$ is governed by the Lindbladian $$\dot{\rho} = \kappa_2 \mathcal{D}_2(\rho) + \ldots$$

where $\mathcal{D}_2 = \mathcal{D}[F_{II}]$. $\kappa_2$ is a non-negative rate and "..." represents competing error processes, which include loss errors and dephasing errors. The loss errors are caused by dissipators of the form $\kappa_a \mathcal{D}[a]$ and $\kappa_b \mathcal{D}[b]$, and the dephasing errors caused by dissipators of the form $\kappa_n \mathcal{D}[\hat{n}]$ and $\kappa_m \mathcal{D}[\hat{m}]$. Quantum information may be encoded in steady states of $\mathcal{D}_2$, which are states $\rho$ in which $\mathcal{D}_2(\rho) = 0$. These states form a decoherence-free subspace of $\mathcal{D}_2$ represented by its projection $P_2$.

A basis may be constructed for the two-mode coherent states using the difference in photon number between the two modes $\Delta$, as determined by the operator $\hat{\Delta} = \hat{m} - \hat{n}$. The operator $\hat{\Delta}$ commutes with ab and therefore commutes with $F_{II}$. Thus, the space of states annihilated by the jump can be spanned by a basis of states with fixed eigenvalues $\Delta \in \mathbb{Z}$. To determine these states, let us define projections onto sectors of fixed $\Delta$, $$P_\Delta = \begin{cases} \sum_{n=0}^{\infty} |n, n+\Delta\rangle\langle n, n+\Delta| & \Delta \geq 0 \\ SWAP P_{|\Delta|} SWAP & \Delta < 0 \end{cases}$$

where the SWAP operator SWAP $|n, m\rangle = |m, n\rangle$ is $$SWAP = \exp\left[i\tfrac{\pi}{2}(a^\dagger - b^\dagger)(a - b)\right].$$

From here on for convenience it is assumed that $\Delta \geq 0$, since an application of SWAP will produce corresponding results for $\Delta < 0$. The above projections $P_\Delta$ may be applied to the two-mode coherent state $|\gamma, \gamma\rangle$ to determine a basis for the code space. Such projection yields:

$$|\gamma_\Delta\rangle = \frac{P_\Delta |\gamma, \gamma\rangle}{\sqrt{N_\Delta}}$$

$$= \frac{1}{\sqrt{I_\Delta(2|\gamma|^2)}} \sum_{n=0}^{\infty} \frac{\gamma^{2n+\Delta}}{\sqrt{n!(n+\Delta)!}} |n, n+\Delta\rangle$$

with $I_\Delta$ being a modified Bessel function of the first kind and normalization:

$$N_\Delta = \langle \gamma, \gamma | P_\Delta | \gamma, \gamma \rangle = e^{-2|\gamma|^2} I_\Delta(2|\gamma|^2)$$

It can be shown, since ab commutes with $P_\Delta$, that $ab|\gamma_\Delta\rangle = \gamma^2|\gamma_\Delta\rangle$.

Figure 3:
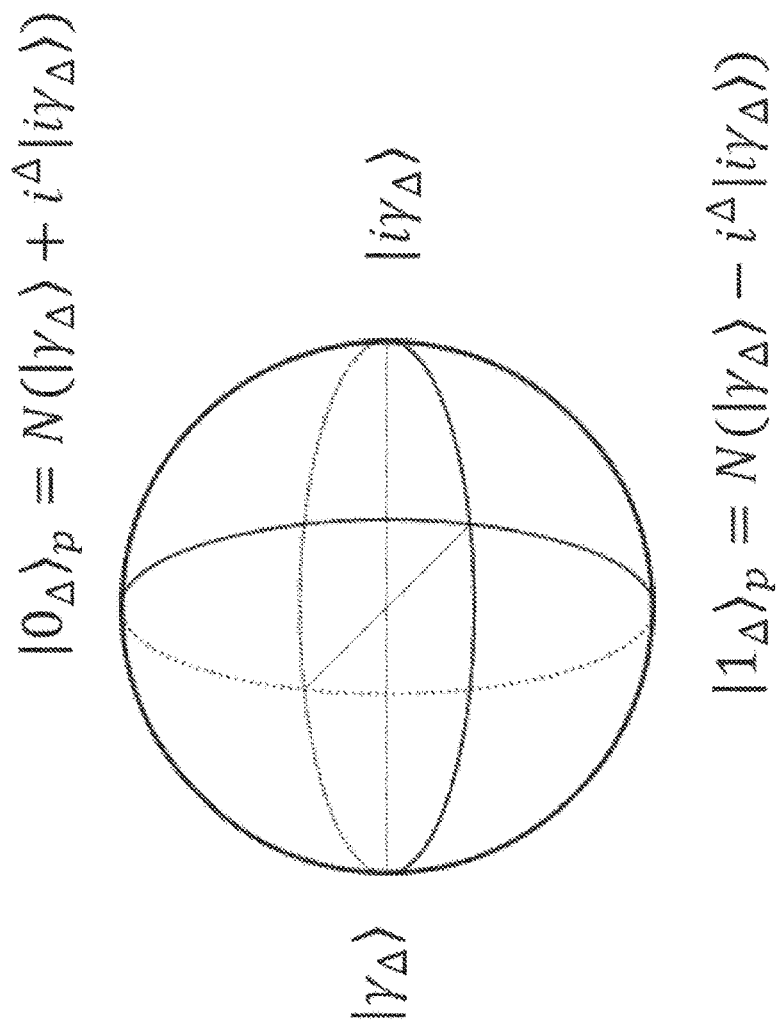
FIG. 3 depicts an illustration of the Bloch sphere of a qubit encoded with the pair-cat codes, according to some embodiments.

An illustration of how a qubit may be encoded with the pair-cat codes is shown in FIG. 3. Note that, since $|\gamma_\Delta\rangle$ is dependent on $\Delta$, the encoding is specific to a particular $\Delta$ subspace. Bloch sphere 300 depicts a geometrical representation of the state space of the two-mode logical qubit represented by oscillators 211 and 212 shown in FIG. 2.

With respect to errors occurring when quantum information is encoded in logical qubit 210, initially it is noted that a and b by shift the number difference $\Delta$ in opposite directions:

$$aP_\Delta = P_{\Delta+1} a$$

$$bP_\Delta = P_{\Delta-1} b$$

That is, a photon jump changes the $\Delta$ subspace but retains the projection within the subspace. For instance, given logical basis states within each subspace of fixed $\Delta$, $$|0_\Delta\rangle_P = N_\Delta(|\gamma_\Delta\rangle + i^\Delta |i\gamma_\Delta\rangle)$$

$$|1_\Delta\rangle_P = N_\Delta(|\gamma_\Delta\rangle + i^\Delta |i\gamma_\Delta\rangle)$$

any number of photon jumps produce:

$$a^n |0_\Delta\rangle_P = |0_{\Delta+n}\rangle_P$$

$$b^m |0_\Delta\rangle_P = |0_{\Delta-m}\rangle_P$$

A photon jump in either oscillator simply changes the $\Delta$ subspace and is correctable. For instance, in the system of FIG. 2, error syndrome detection circuit 240 may be configured to detect a change in the number difference (e.g., by performing a QND measurement of $\Delta$). The error syndrome detection circuit 240 and/or one or more other components of system 200 not depicted may perform an operation on one or both of oscillators 211 and 212 to return the state to a desired $\Delta$ subspace (e.g., the $\Delta=0$ subspace).

Figure 4:
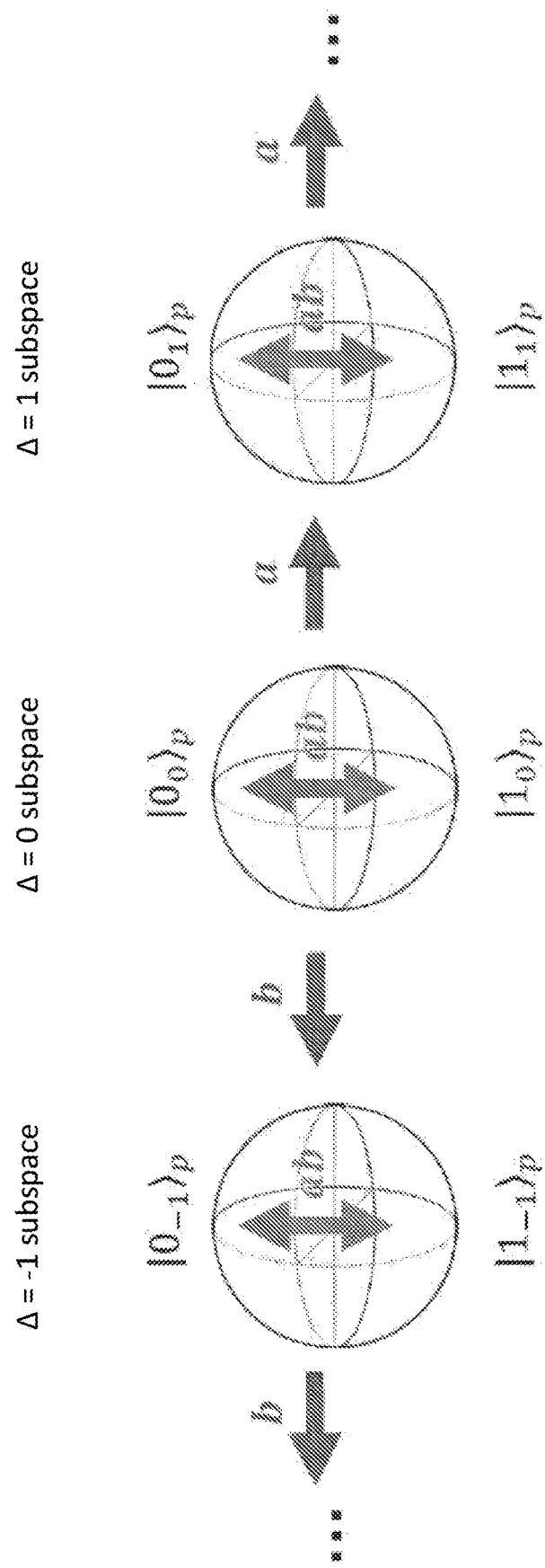
FIG. 4 depicts a plurality of subspaces of the pair-cat codes, according to some embodiments.

FIG. 4 depicts a selection of the $\Delta$ subspaces ($\Delta=-1, 0$ and 1) to illustrate how photon jumps simply change the $\Delta$ subspace. Note that the conventional cat codes rely on the parity as a quantum number, which has two distinct eigenvalues (odd or even), whereas the pair-cat codes rely on $\Delta$ as a quantum number, which has an infinite number of values, and therefore an infinite number of code spaces exist.

As also shown in FIG. 4, a simultaneous loss of photons from both oscillators leads to a bit flip but does not produce an error syndrome with the pair-cat codes, and therefore represents an uncorrectable error:

$$ab|0_\Delta\rangle_P = N_\Delta(|\gamma_\Delta\rangle - i^\Delta |i\gamma_\Delta\rangle) = |1_\Delta\rangle_P$$

Through frequent detection and correction of photon jump errors, the rate of such errors may be reduced or avoided, however. Since precisely simultaneous loss of photons from both oscillators may not occur, a sufficiently frequent detection and correction may resolve individual jumps and thereby allow correction of all photon loss errors.

Moreover, the dissipator $\mathcal{D}_2 = \mathcal{D}[F_{II}] = \mathcal{D}[a^2 b^2 - \gamma^4]$ is protective of dephasing errors. In particular, since $\mathcal{D}[\hat{n}]$ and $\mathcal{D}[\hat{m}]$ both commute with $\hat{\Delta}$, dephasing does not connect code spaces for different values of $\Delta$. This leaves dephasing within each $\Delta$ subspace, and the rates of such errors decrease exponentially with $\gamma$. As a result, dephasing errors may be suppressed by implementing a suitably large value of $\gamma$ (in the system of FIG. 2, for instance).

In view of the above, by engineering suitable states of the oscillators 211 and 212 in FIG. 2 according to the pair-cat codes, errors may be suppressed as follows. First, through application of drive waveforms 225 to the mixing circuit 220, a dissipative process of the form $\mathcal{D}[a^2 b^2 - \gamma^4]$ may be realized and thereby protect against dephasing errors. Second, by detection of photon jump errors using error syndrome detection circuit 240, a suitable operation (or operations) to correct for said jump errors may be applied to the oscillator 211 and/or oscillator 212 by the circuit 240 or otherwise. These two mechanisms may thereby allow for the two-mode state encoded by the oscillators in FIG. 2 to be robust against all types of errors except for a simultaneous loss (or gain) of photons in both cavities.

Figure 5:
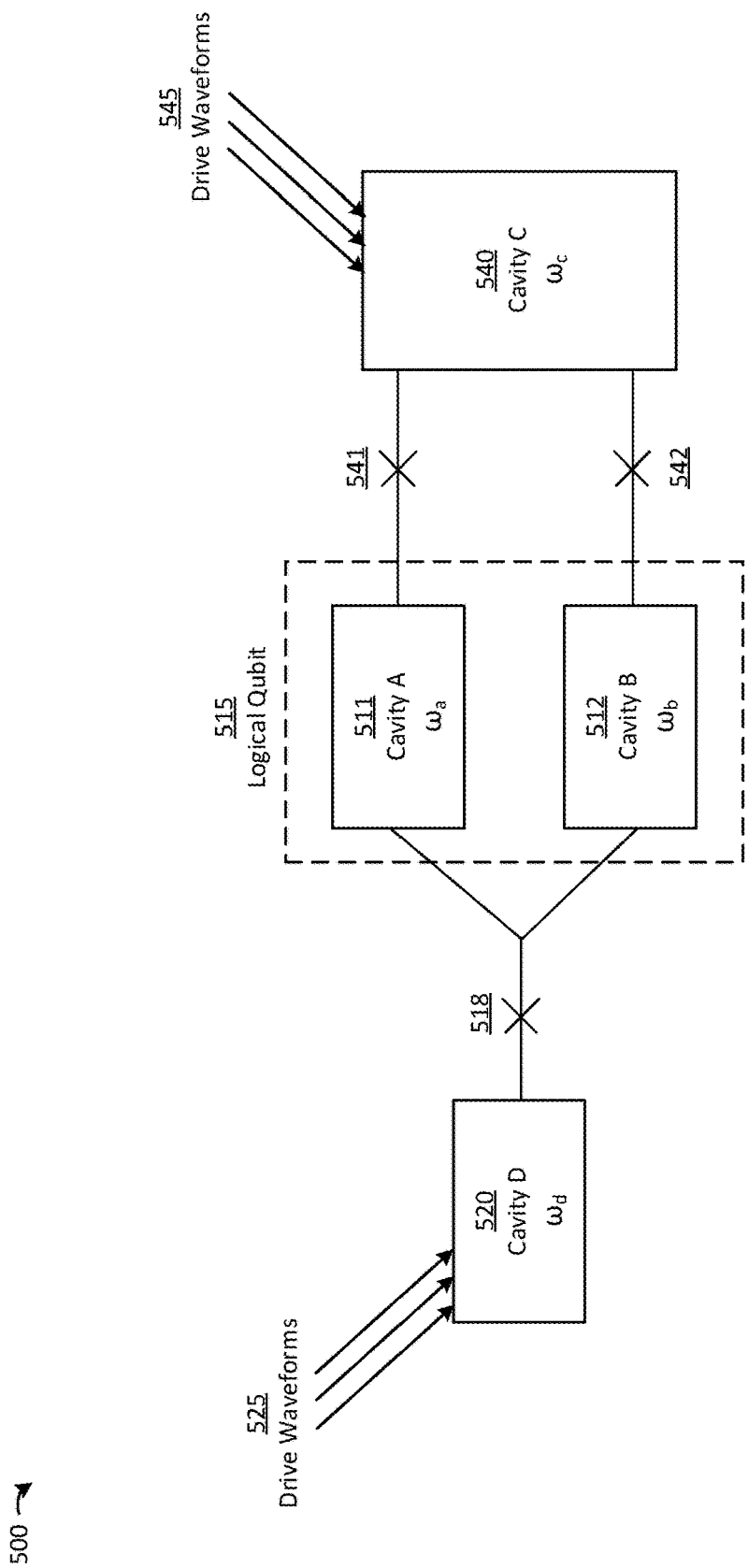
FIG. 5 depicts an illustrative system for encoding a logical qubit in the state of two quantum mechanical oscillators, according to some embodiments.

System 500 shown in FIG. 5 represents one illustrative implementation of the system of FIG. 2, according to some embodiments. In the example of FIG. 5, logical qubit 515 is implemented via cavities 511 and 512, which are each coupled to a Josephson junction 518. The cavity 520 facilitates entropy extraction via the driven-dissipative process as discussed above through a mixing process implemented through drive waveforms 525. Cavity 540 is coupled to cavities 511 and 512 via respective Josephson junctions 541 and 542, and is configured to perform measurement of the error syndrome $\hat{\Delta} = b^\dagger b - a^\dagger a$, which is the photon number difference in the cavities 511 and 512. Drive waveforms 545 are configured to realize a displacement of cavity 540 that is proportional to $\hat{\Delta}$.

According to some embodiments, cavities 511 and 512 may be comparatively high-Q cavities, whereas cavities 520 and 540 may be comparatively low-Q cavities. Any one or more of cavities 511, 512, 520 and 540 may, for example, comprise a resonating cavity such as an optical cavity or a microwave cavity.

According to some embodiments, drive waveforms 525 may be configured to introduce an exchange of energy between one or both of cavities 511 and 512 and the Josephson junction 518. In some cases, energy may be transferred from one or both of the cavities 511 and 512 to the junction, thereby exciting the junction. Subsequently, the junction may be reset to a lower energy level, thereby realizing an appropriate dissipative process.

Figure 6:
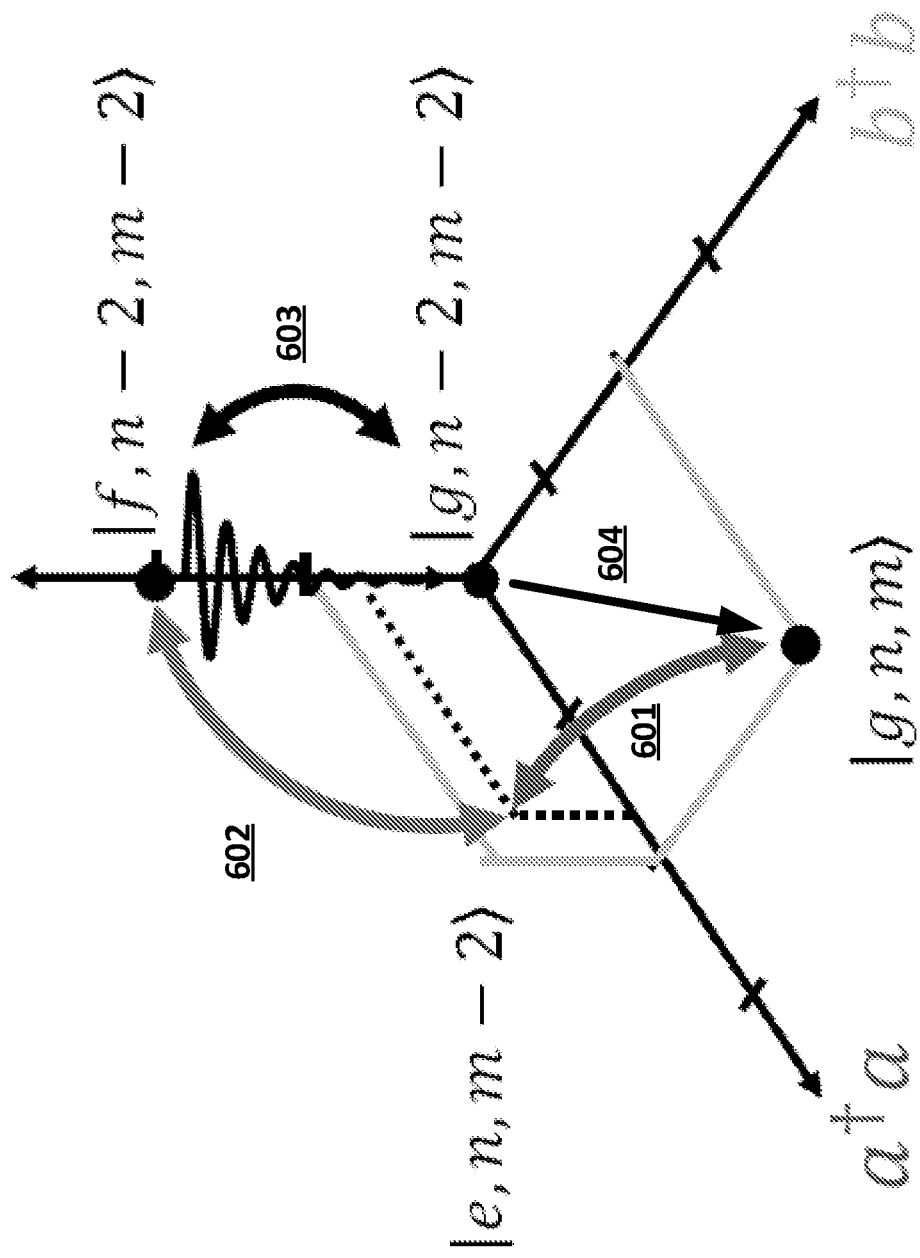
FIG. 6 illustrates a three-dimensional energy level diagram illustrating a dissipative process which protects against dephasing errors, according to some embodiments.

An example of such an approach is shown in FIG. 6, which illustrates a three-dimensional energy level diagram 600 having axes of the number densities of each cavity ($\hat{n} = a^\dagger a$ and $\hat{m} = b^\dagger b$) and of the excitation level of the Josephson junction 518. In FIG. 6, the lowest three eigenstates (energy levels) of the junction 518 are labeled g, e and f in order of increasing energy. The Fock-states of the cavities 511 and 512 are denoted by numbers n and m.

In the example of FIG. 6, a cascading process is applied to an initial state $|g, n, m\rangle$, i.e., with the junction 518 in its ground (g) state and the two cavities 511 and 512 having Fock-states n and m, respectively. In an initial step 601 of the process, the application of energy to the cavity 520 via one or more of the drive waveforms 525 connects the initial state $|g, n, m\rangle$ to a virtual state detuned from the state $|e, n, m-2\rangle$ by an amount $\delta$. This detuning is shown in FIG. 6 via the dashed line connecting to the $|e, n, m-2\rangle$ state. In step 602, the detuned $|e, n, m-2\rangle$ state is connected with a state $|f, n-2, m-2\rangle$ through further application of energy to the cavity 520 via one or more of the drive waveforms 525. As a result of the steps 601 and 602, a pair of two-photon exchanges (one from each of the cavities 511 and 512) cause excitation of the junction 518.

In step 603, the effective two-photon dissipation on each of the two cavities may be implemented by having the junction relax from $|f, n-2, m-2\rangle$ to $|g, n-2, m-2\rangle$ through further application of energy to the cavity 520 via one or more of the drive waveforms 525. In step 604 application of energy to the cavity 520 via one or more of the drive waveforms 525 may return the state to $|g, n, m\rangle$. It will be appreciated that any number of drive waveforms 525 may be applied to produce this sequence of state transitions and that any one of the drive waveforms 525 may produce any one or more of the above-described steps.

One non-limiting practical implementation of the process illustrated in FIG. 6 is described below. In this example, a Hamiltonian for the cavities 511 and 512 (with lowering operators a, b and frequencies $\omega_a$ and $\omega_b$, respectively) and a mode of the Josephson junction 518 having lowering operator J, frequency $\omega_J$ and Josephson energy $E_J$ is considered, driven by a time-dependent drive $\hbar\varepsilon(t)J$+h.c. Let $$H'=H_0-\tfrac{1}{24}E_J\hat{\varphi}^4+\hbar(\varepsilon(t)J+\varepsilon^*(t)J^\dagger).$$

comprise the harmonic portion of the full Hamiltonian as well as the anharmonic portion of the junction Hamiltonian, where $$\frac{H_0}{\hbar}=\omega_a a^\dagger a+\omega_b b^\dagger b+\omega_J J^\dagger J$$

$$\hat{\varphi}=\phi_a a+\phi_b b+\phi_J J+h.c.$$

and $\phi_{a,b,J}=\phi_{ZPF,(a,b,J)}/\phi_0$ denote the amplitude participation ratios of the respective modes in the junction with $\phi_{ZPF,(a,b,J)}$ corresponding to the zero point fluctuations of the respective modes as seen by the junction and $$\phi_0=\frac{\hbar}{2e}$$

being the reduced superconducting flux quantum.

Considering driving waveforms that comprise three tones as follows:

$$\varepsilon(t)=\sum_{k=1}^{3}\epsilon_{pk}\exp(i\omega_{pk}t)$$

a sequence of transformations may be applied that absorbs, one tone at a time, the entire $\varepsilon$ drive into $\varphi^4$, the anharmonic part of the junction 518. The drives $\varepsilon$ may be tuned so that the above-described process of FIG. 5 is produced, with the drive frequencies $$\omega_{p1}=2\tilde{\omega}_b-\tilde{\omega}_{ge}-\delta$$

$$\omega_{p2}=2\tilde{\omega}_a-\tilde{\omega}_{ef}-\delta$$

$$\omega_{p3}=\tfrac{1}{2}(\tilde{\omega}_{ge}+\tilde{\omega}_{ef})$$

where the states $|e\rangle$, $|f\rangle$ and $|g\rangle$ of the junction define a transition frequency $\tilde{\omega}_{ge}$ between $|g\rangle$ and $|e\rangle$, and a transition frequency $\tilde{\omega}_{ef}$ between $|e\rangle$ and $|f\rangle$. Moreover, the cavity frequencies $\omega_a$ and $\omega_b$ have been (Lamb- and Stark-)shifted to new frequencies $\tilde{\omega}_a$ and $\tilde{\omega}_b$ in producing a new Hamiltonian:

$$\frac{\tilde{H}_0}{\hbar}=\tilde{\omega}_a a^\dagger a+\tilde{\omega}_b b^\dagger b+\tilde{\omega}_{ge}\hat{\sigma}_{ee}+(\tilde{\omega}_{ge}+\tilde{\omega}_{ef})\hat{\sigma}_{ff}$$

with $\hat{\sigma}_{kl}=|l\rangle\langle k|$ and $|l\rangle$ and $|k\rangle$ being junction states.

Figure 7:
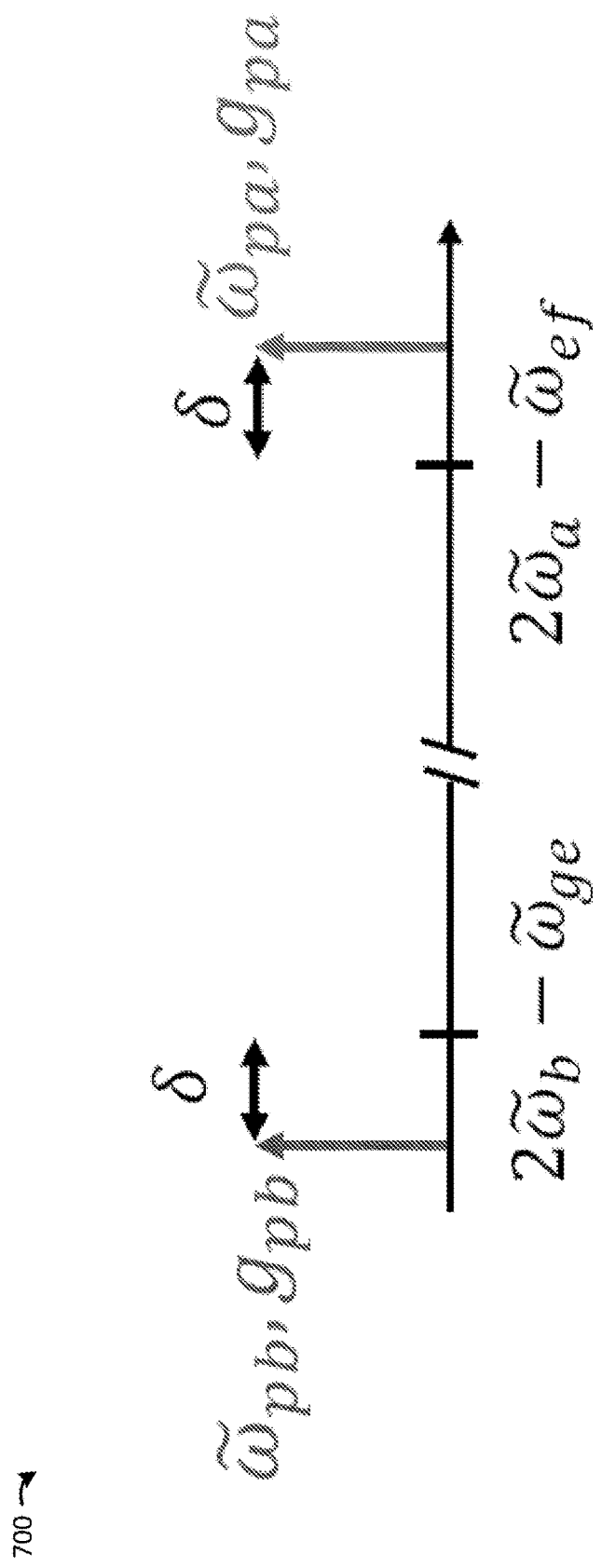
FIG. 7 illustrates frequencies of drive waveforms which may be applied to produce the dissipative process of FIG. 6, according to some embodiments.

The drive frequencies $\omega_{p1}$ and $\omega_{p2}$ are detuned by $\delta$ as discussed above to together produce an exchange of two photons in each cavity with the ef excitation of the junction. The drive $\omega_{p3}$ selects a term $\hat{\sigma}_{gf}=|f\rangle\langle g|$ that, in the presence of dissipation, translates into a simultaneous two-photon drive on both cavities and produces the dissipator $F_{II}$ with nonzero $\gamma$. A schematic of the drive frequencies $\omega_{p1}$ and $\omega_{p2}$ is shown in FIG. 7.

As discussed above, in the example of FIG. 2 the error syndrome detection circuit 240 and/or one or more other components of system 200 not depicted may perform an operation on one or both of oscillators 211 and 212 to return the state to a desired $\Delta$ subspace after the loss of a boson. An illustrative approach to correcting such errors will now be described with respect to the illustrative system 500 of FIG. 5.

In the example of FIG. 5, the error syndrome detection circuit comprises modes of each of the Josephson junctions 541 and 542. These two junction modes couple the cavities 511 and 512 to a cavity 540. The following approach relies upon the four-wave mixing capabilities of the two Josephson junction modes to link the displacement of cavity 540 to the photon number difference between the two modes of the cavities 511 and 512.

At a high level, the approach described below performs displacement operations on cavity 540 that are dependent upon the photon numbers in the cavities 511 and 512. By adjusting the magnitudes and phases of the pumps 545, a total joint cavity dependent displacement may be applied to cavity 540, allowing for direct measurement of the error syndrome $\Delta$. This principle is depicted in the schematic of FIG. 8, which illustrates the simultaneous application of two displacements $D(\epsilon_\Delta a^\dagger a)$ and $D(-\epsilon_\Delta b^\dagger b)$ with pumps 545, which together produce a $\Delta$-dependent displacement of cavity 540.

Figure 8:
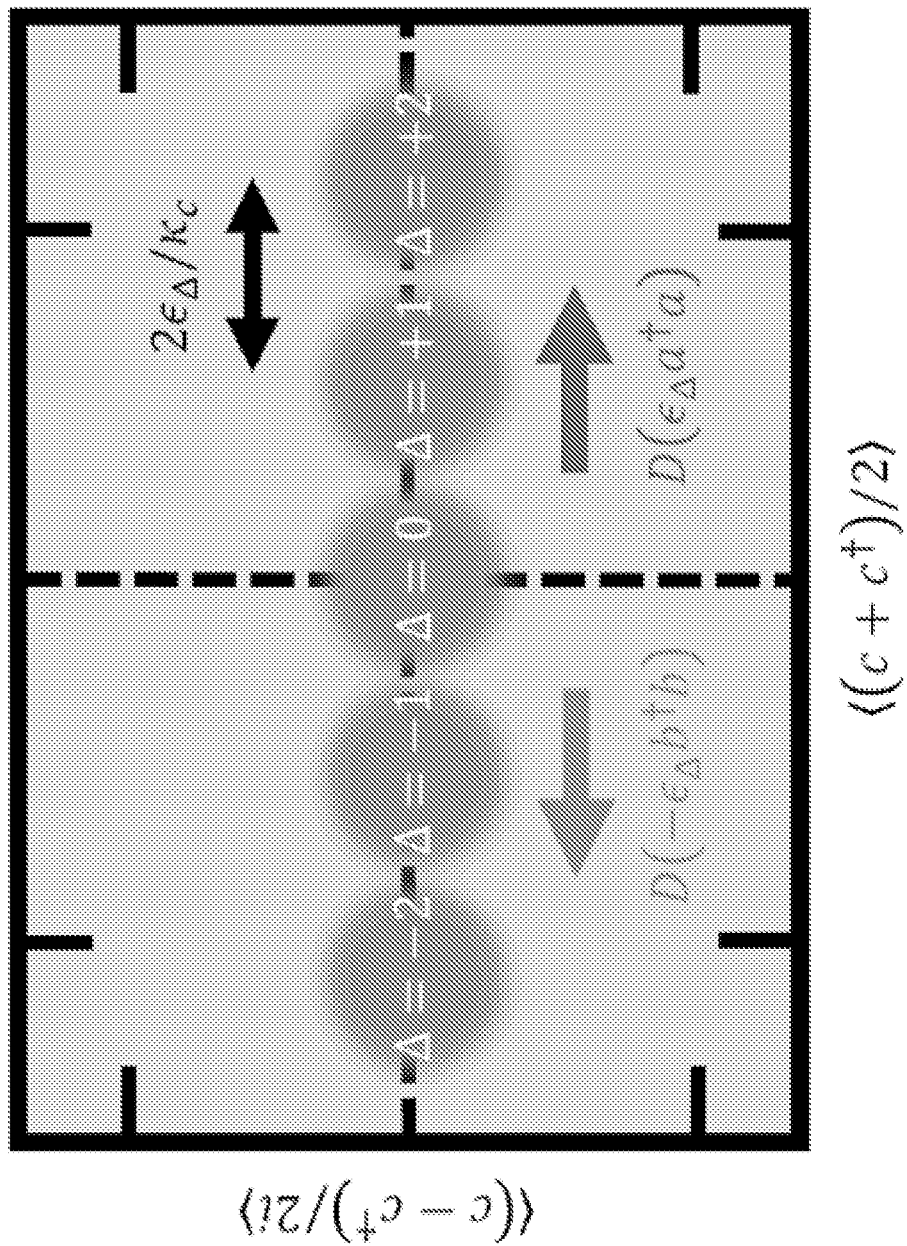
FIG. 8 illustrates a principle of applying photon number-dependent displacements to detect a photon loss error, according to some embodiments.

As shown in FIG. 8, there are two junction modes $J_{1,2}$ coupling the two cavities a and b (cavities 511 and 512) to a readout cavity c (cavity 540). It is assumed that cavity a couples only to junction $J_1$ and cavity b couples only to junction $J_2$. Both junctions couple to cavity c. It is assumed that the two junction modes are isolated from each other and can be driven independently. The two junctions and cavity c are driven with drives parameterized by $\epsilon_{1,2,c}$, respectively. Assuming $|\hbar\epsilon_{1,2,c}|\ll E_{J1,2}$ and expanding the anharmonic parts of the two junctions yields $$H=H_0-\tfrac{1}{24}E_{J1}\hat{\varphi}_1^4-\tfrac{1}{24}E_{J2}\hat{\varphi}_2^4+\hbar\exp(i\tilde{\omega}_c t)(\epsilon_c c+\epsilon_1 J_1+\epsilon_2 J_2)+h.c.$$

where $$\frac{H_0}{\hbar}=\omega_a a^\dagger a+\omega_b b^\dagger b+\omega_c c^\dagger c+\omega_{J1}J_1^\dagger J_1+\omega_{J2}J_2^\dagger J_2$$

is the harmonic part, the phase differences across the junctions $k\in\{1,2\}$ are $$\hat{\varphi}_1=\phi_{a1}a+\phi_{c1}c+\phi_1 J_1+h.c.,$$

$$\hat{\varphi}_2=\phi_{b2}b+\phi_{c2}c+\phi_2 J_2+h.c.,$$

and $\phi$ are the amplitude participation ratios.

The two junctions 541 and 542 are both independently driven at the frequency $\tilde{\omega}_c$ of cavity 540, which we set to be the shifted frequency of mode c after normal ordering. We also apply a direct resonant drive to cavity 540 of strength $\epsilon_c$; the importance of this drive will be clear in the next couple of steps.

We absorb the $J_{1,2}$-drives on the junction modes in the respective anharmonicities leave the c-cavity drive untouched. This yields $$H'=H_0-\tfrac{1}{24}E_{J1}[\hat{\Phi}_1(t)]^4-\tfrac{1}{24}E_{J2}[\hat{\Phi}_2(t)]^4+\hbar\epsilon_c\exp(i\tilde{\omega}_c t)c+h.c.$$

where the time-dependent phase differences are $$\hat{\Phi}_1(t)=\phi_{a1}a+\phi_{c1}c+\phi_1 J_1+\phi_1\xi_1\exp(i\tilde{\omega}_c t)+h.c.$$

$$\hat{\Phi}_2(t)=\phi_{b2}b+\phi_{c2}c+\phi_1 J_2+\phi_2\xi_2\exp(i\tilde{\omega}_c t)+h.c.$$

and $\xi_k$ are the displacements of the junction modes due to the respective drives. Finally, we normal-order the anharmonicities, go into a rotating frame with respect to the Lamb- and Stark-shifted shifted harmonic part, $$\frac{\tilde{H}_0}{\hbar} = \tilde{\omega}_a a^\dagger a + \tilde{\omega}_b b^\dagger b + \tilde{\omega}_c c^\dagger c + \tilde{\omega}_{J1} J_1^\dagger J_1 + \tilde{\omega}_{J2} J_2^\dagger J_2$$

and keep only the non-rotating terms. Since the only drive frequency is $\tilde{\omega}_c$, the only off-diagonal time-independent terms are those for which the number of c terms is equal to the number of $\xi^*_{1,2}$ terms plus the number of $c^\dagger$ terms (and their Hermitian conjugates). We also assume that the junction modes $J_{1,2}$ are never resonantly driven and hence are never populated. Therefore, for the sake of compactness, we drop all the diagonal terms involving the $J_k^\dagger J_k$ operator. The system Hamiltonian becomes $$\frac{H_{sys}}{\hbar} = -\chi_{ac} a^\dagger a c^\dagger c - \chi_{bc} b^\dagger b c^\dagger c -$$
$$\sum_{r=a,b,c} \frac{\chi_{rr}}{2} r^{\dagger 2} r^2 - \left(\epsilon_c + g_{dir} + g_s c + \sum_{r=a,b,c} g_r r^\dagger r\right) c + h.c.$$

where the couplings are $$g_{dir} = \frac{1}{2\hbar} \sum_{k=1,2} E_{jk} \phi_k^3 \phi_{ck} |\xi_k|^2 \xi_k$$

$$g_s = \frac{1}{4\hbar} \sum_{k=1,2} E_{jk} \phi_{ck}^2 \phi_k^2 \xi_k^2$$

$$g_a = \frac{E_{J1}}{\hbar} \phi_{a1}^2 \phi_{c1} \phi_1 \xi_1$$

$$g_b = \frac{E_{J2}}{\hbar} \phi_{b2}^2 \phi_{c2} \phi_2 \xi_2$$

$$g_c = \frac{1}{2\hbar} \sum_{k=1,2} E_{jk} \phi_{ck}^3 \phi_k \xi_k$$

The remaining step now is to tune the second line of such that we obtain the term $\hat{\Delta} c + h.c.$ We can adjust the amplitude and the phase of $\xi_{1,2}$ such that $$|g_a| = |g_b| = \epsilon_\Delta$$

and $$\arg(g_a) = \arg(g_b) + \pi = 0$$

For $\phi_{a1} \approx \phi_{b2}$, $\phi_{c1} \approx \phi_{c2}$, $E_{J1} \approx E_{J2}$, and $\phi_1 \approx \phi_2$, the magnitude of the terms in the above equations for $g_{dir}$ and $g_c$ becomes minimal. The remaining $g_{dir}$ can be canceled by setting $\epsilon_c = -g_{dir}$, yielding $$\frac{H_{sys}}{\hbar} = -\chi_{ac} a^\dagger a c^\dagger c - \chi_{bc} b^\dagger b c^\dagger c -$$
$$\sum_{r=a,b,c} \frac{\chi_{rr}}{2} r^{\dagger 2} r^2 - \left(g_s c + g_c c^\dagger c + \epsilon_\Delta \hat{\Delta}\right) c + h.c.$$

Hence we can engineer the displacement term of the cavity mode c to be proportional to the error syndrome measurement operator $$\hat{\Delta} = b^\dagger b - a^\dagger a$$

By applying this displacement to the cavity 540, the state of the cavity 540 may be engineering to be indicative of $\Delta$. Accordingly, reading the state of the cavity 540 may indicate the value of $\Delta$ and an appropriate operation may be performed to correct for any error indicated by the state. An illustrative example of how such operations may be performed in practice is described in International Patent Application No. PCT/US2017/017534, filed Feb. 10, 2017, entitled "Techniques For Control Of Quantum Systems And Related Systems And Methods", which is hereby incorporated by reference.

Figure 9A:
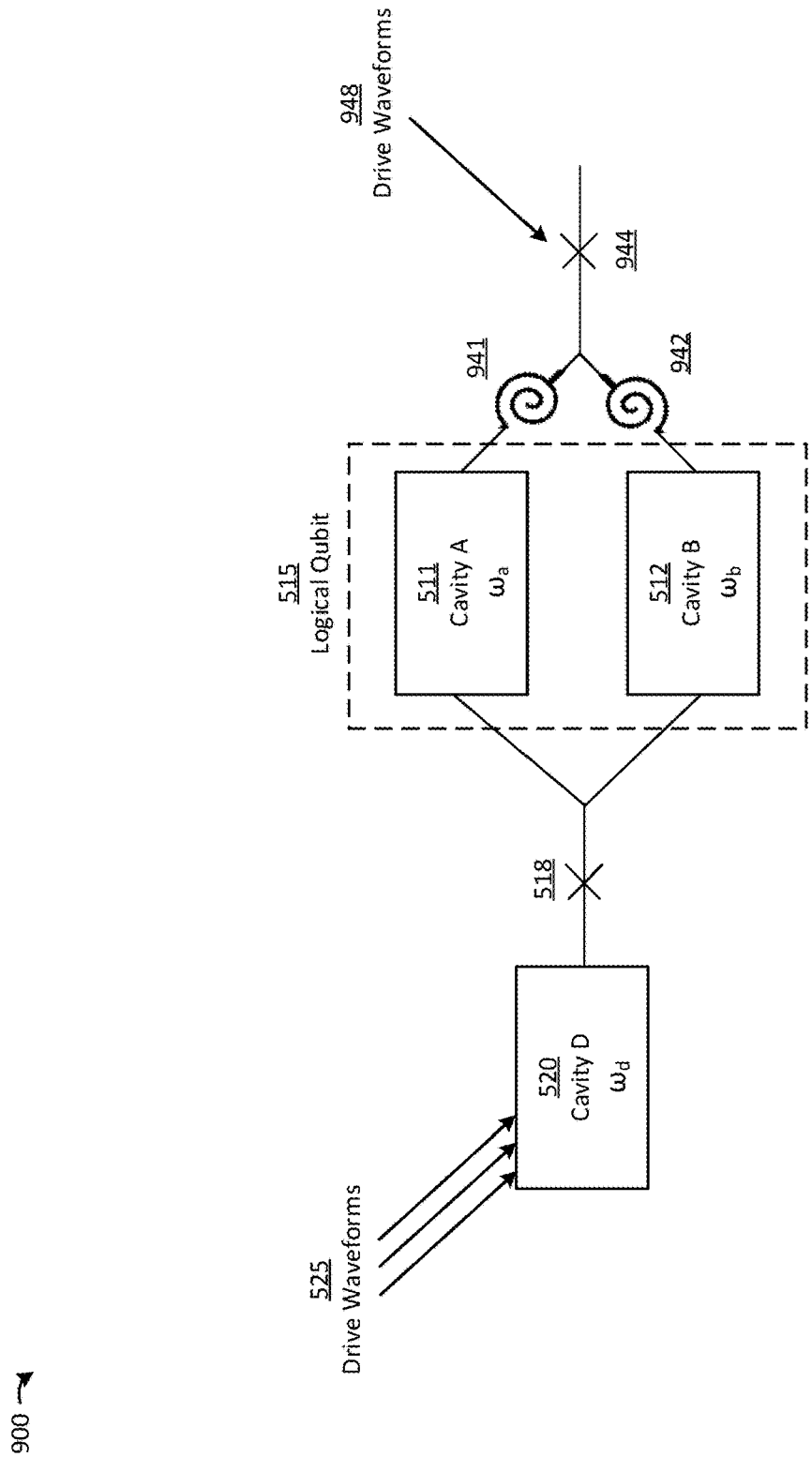
FIGS. 9A-9C depict an illustrative system for encoding a logical qubit in the state of two quantum mechanical oscillators, according to some embodiments.

An alternative approach to correcting photon loss errors is shown in FIG. 9A. In system 900, portions of the system on the left are identical to those shown in FIG. 5 and discussed above. In particular, the above-described process for protecting against dephasing errors in the two-mode state of cavities 511 and 512 may be applied within system 900. However, system 900 presents an alternative approach to FIG. 5 in that the two Josephson junctions and additional cavity that may implement error syndrome detection are replaced by a Josephson junction 944 coupled to both cavities 511 and 512 via respective Superconducting Nonlinear Asymmetric Inductive eLements (SNAILs) 941 and 942. Elements 941, 942 and 944 provide an autonomous approach to correcting photon loss errors as discussed below through application of suitable drive waveforms 948 to the junction 944.

At a high level, the alternate approach provided by system 900 is based on compensating single photon losses in either cavity 511 or 512 by adding photon gain jump operators that are conditional on $\Delta = \pm 1$ through application of energy to the junction 944. The SNAILs 941 and 942 each comprise a superconducting loop of a number of comparatively large Josephson junctions and a one smaller Josephson junction with tunneling energies of $E_J$ and $\alpha E_J$, respectively. Further details of structure of a SNAIL are described in "3-wave mixing Josephson dipole element," Appl. Phys. Lett. 110, 222603 (2017), which is incorporated herein by reference in its entirety.

For mode a, the jump operator is $$F(1) = a^\dagger P_{\Delta=1}$$

Similarly, $$F(-1) = b^\dagger P_{\Delta=-1}$$

for mode b. A difference between these jumps and the ideal continuous QEC jumps with $\Delta = \pm 1$ is the extra raising operator. Even though this recovery implements first-order dephasing errors $aa^\dagger$ or $bb^\dagger$ when combined with the preceding loss event, these jumps may have a negligible effect on the code states for sufficiently large $\gamma$.

We now sketch this proposal, focusing for the sake of example on correction for $\Delta = 1$ (mode a loss) only. In the exposition below, we apply perturbation theory sequentially. However, all terms could also be introduced simultaneously in a more involved calculation that yields the same low-order result with higher order corrections.

The SNAILs 941 and 942, which are three-wave mixers, provide Jaynes-Cummings type couplings between the junction and respective cavities 511 and 512 without any additional Kerr nonlinearities. We thus begin with a two-mode driven Jaynes-Cummings Hamiltonian $$H = \omega_a a^\dagger a + \omega_b b^\dagger b + \tfrac{1}{2} \omega_q \sigma_z$$

$$+ g(a\sigma_+ e^{-i\omega_{pa}t} + b\sigma_+ e^{-i\omega_{pb}t} + h.c.)$$

with cavity frequencies $\omega_{a,b}$, Josephson junction frequency $\omega_g$, real pump drive g, and pump frequencies $\omega_{pa}$, $\omega_{pb}$ (where the drive 948 is also referred to as a pump drive). Setting $\omega_{pa}=\omega_a-\omega_q+\delta$ and $\omega_{pb}=\omega_b-\omega_q-\delta$ and going into the rotating frame with respect to $H_0=\omega_a a^\dagger a+\omega_b b^\dagger b+\frac{1}{2}\omega_q \sigma_z+\delta\hat{\Delta}$ for $\delta>0$. The pump strengths are then set so we are in the dispersive regime: $g\langle k^\dagger k\rangle \ll \delta$ with $\langle k^\dagger k\rangle$ being the average occupation number in cavity $k\in\{a, b\}$.

In the dispersive limit, the Hamiltonian becomes $$\frac{g^2}{\delta}\hat{\Delta}\sigma_Z \equiv \Omega_\Delta \hat{\Delta}\sigma_Z$$

For each pair of levels, the two cavities are in the subspace of fixed $\Delta$ while the junction is either in $|g\rangle$ for the bottom level or in $|e\rangle$ for the top.

Figure 9B:
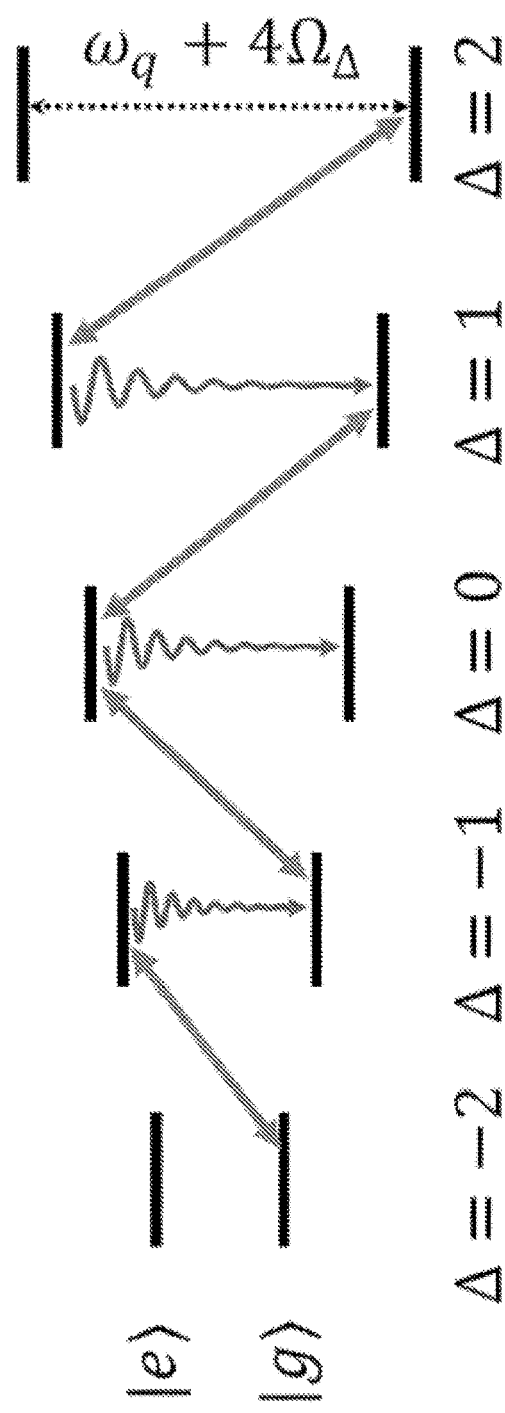

In contrast to the approach described with respect to FIGS. 5, 6 and 7, the system of FIG. 9A does not perform a discrete readout of the error syndrome, but rather continuously performs the correction operation. As shown in FIG. 9B, the engineered cross-Kerr interaction described above induces a $\hat{\Delta}$-dependent junction frequency. For each pair of levels, the cavities 511 and 512 are in the subspace of fixed $\Delta$ while the junction is either in $|g\rangle$ for the bottom level or $|e\rangle$ for the higher level.

When a photon loss event occurs in one of the cavities, the logical qubit stored in the two cavities is transferred into a different $\Delta$ subspace while the junction remains in $|g\rangle$. In the context of FIG. 9B, this shifts the subspace left or right amongst the different sets of junction energy levels shown for each value of $\Delta$ (with only a subset of the infinite possible values of $\Delta$ shown in the figure). The above $\Delta$-dependent junction frequency is responsible for the "telescoping" of the junction energy levels in the schematic 950 of FIG. 9B.

Since the junction frequency depends on the error syndrome, we can add photons to the cavity selectively depending on $\hat{\Delta}$. In particular, for $\Delta=1$, the SNAILs may couple the junction to cavity a via the (counter-rotating) term at $a^\dagger \sigma_+ \exp(-i\omega_{CR}t)$ with frequency $\omega_{CR}$ in the rotating frame with respect to $H_0$. We set $\omega_{CR}=3\Omega_\Delta$, the frequency of the effective two-level system at $\Delta=1$.

The Hamiltonian is then $$H_1=\Omega_\Delta\hat{\Delta}\sigma_z+g_\Delta(a^\dagger\sigma_+ e^{-3i\Omega_\Delta t}+h.c.)$$

with $g_\Delta \ll \Omega_\Delta \ll \delta$. Going into the rotating frame with respect to $\Omega_\Delta\hat{\Delta}\sigma_z$ yields the desired transition:

$$\tilde{H}=g_\Delta(a^\dagger\sigma_+ e^{2i\Omega_\Delta(\hat{\Delta}-1)t}+h.c.)$$

Furthermore, assuming the junction decays with jump operator $\sqrt{\Gamma\sigma_-}$, and adiabatically eliminating the junction, yields a dissipator with jump operator $$\frac{4g_\Delta^2}{\Gamma}F(1).$$

Thus, we have our desired result to first-order.

Figure 9C:
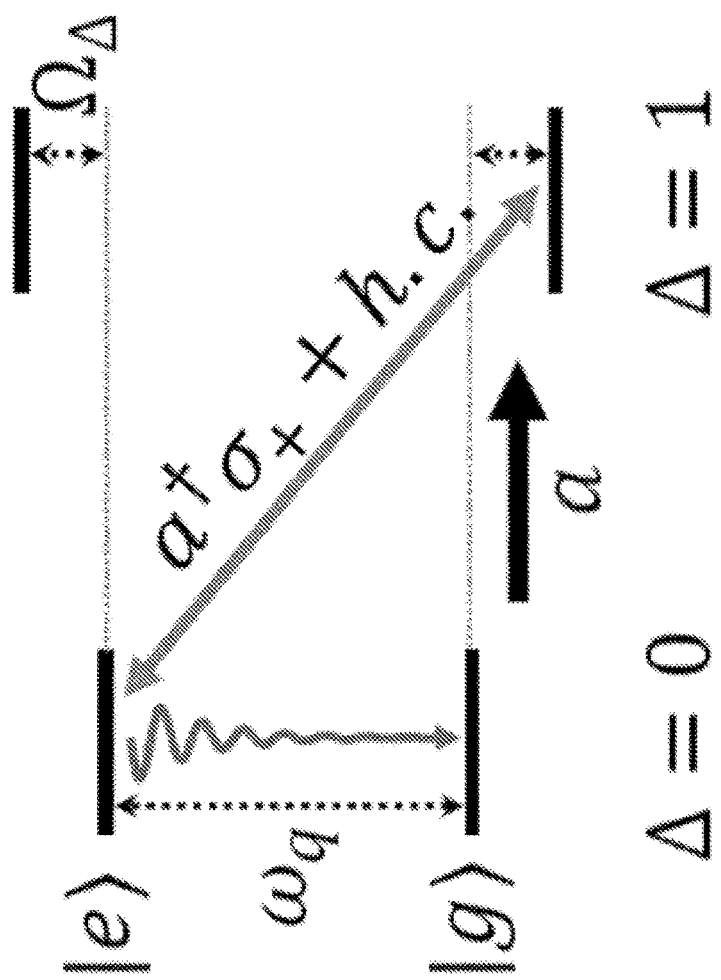

Application of the above-described conditional energy pulse 948 will, conditional on the value of $\hat{\Delta}$, drive the junction to its excited state $|e\rangle$ whilst simultaneously applying an operation a, $a^\dagger$, b, $b^\dagger$, aa, etc. These energy pulses are shown in FIG. 9B using double-headed arrows. Subsequent to such a change in state, the junction may then decay from $|e\rangle$ to $|g\rangle$ to complete the process, with this decay shown as a wavy arrow in FIG. 9B. FIG. 9C includes schematic 960 which shows an example of this process when correcting a single loss event in cavity a. Upon the event, denoted by the thick arrow, the logical qubit stored in the two cavities is transferred into the subspace $P_{\hat{\Delta}=1}$ while the junction remains in $|g\rangle$. The applied pulse (double-headed arrow) then drives the junction to its excited state $|e\rangle$ while simultaneously applying $a^\dagger$ to the cavity system and thereby returning the logical state back to $P_{\hat{\Delta}=0}$.

It will be appreciated that the approach of FIGS. 9A-9C is an example of the error syndrome detection circuit 240 shown in FIG. 2 in the sense that, whilst there is no explicit detection of the change in state due to photon loss, such detection is implicit in that operations are performed that are dependent upon there being a photon loss. As such, elements 941, 942 and 944 in FIG. 9A should be viewed as an example of error syndrome detection circuit 240 of FIG. 2.

Figure 10:
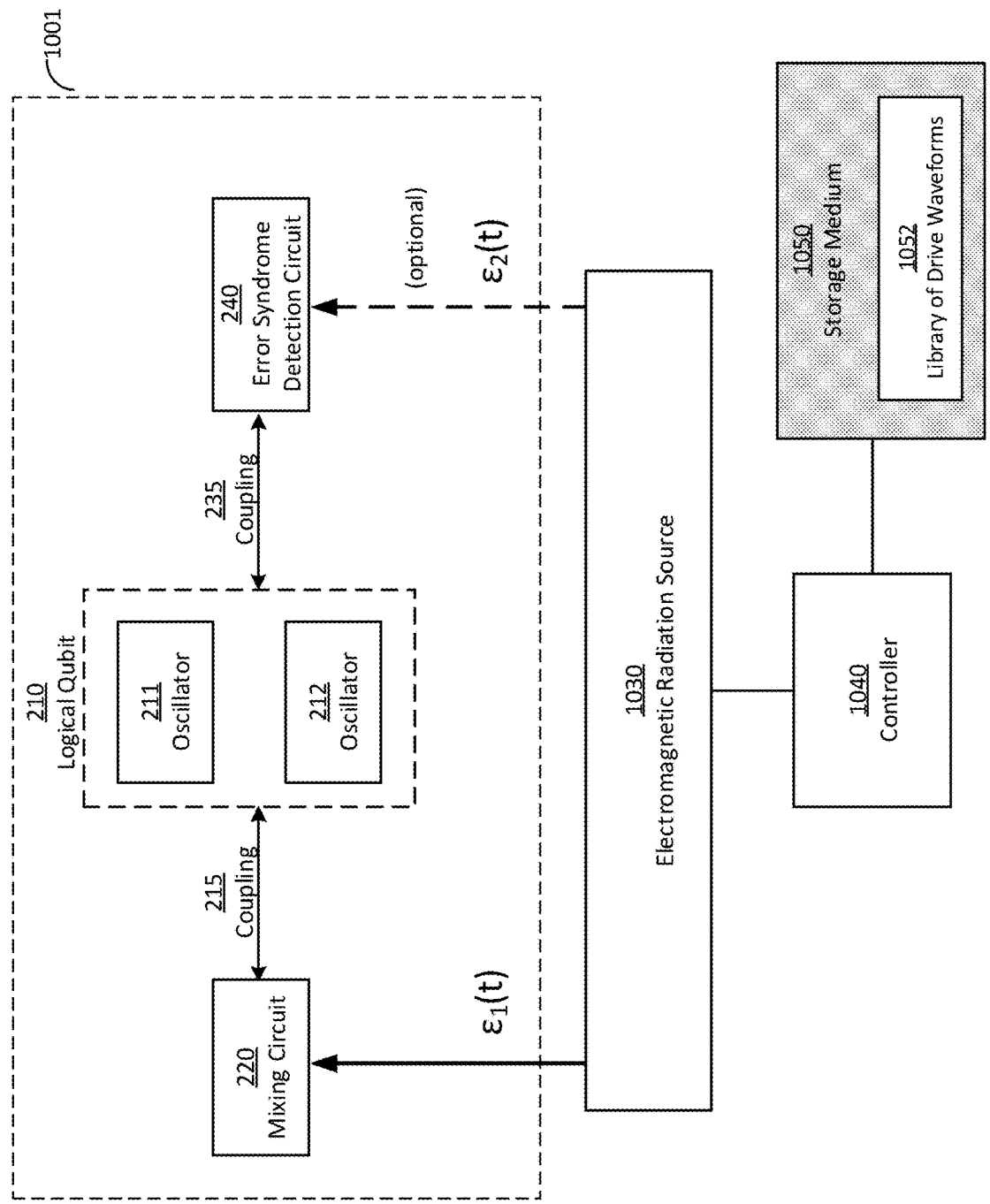
FIG. 10 is a block diagram of a circuit quantum electrodynamics system, according to some embodiments.

FIG. 10 is a block diagram of a circuit quantum electrodynamics system, according to some embodiments. System 1000 includes a system 1001 in addition to electromagnetic radiation source 1030, controller 1040 and storage medium 1050. In some embodiments, a library of precomputed drive waveforms may be stored on a computer readable storage medium and accessed in order to apply said waveforms to system 200 as shown in FIG. 2. In the example of FIG. 10, controller 1040 may be configured to access drive waveforms 1052 stored on storage medium 1050 (e.g., in response to user input provided to the controller) and to control the electromagnetic radiation source 1030 to apply one or more drive waveforms $\varepsilon_1$ (t) to the mixing circuit 220. Optionally, one or more drive waveforms $\varepsilon_2$ (t) may be applied to the error syndrome detection circuit 240.

As non-limiting examples, $\varepsilon_1$ (t) may include drives which, as discussed above, protect against dephasing errors in the implementation of FIG. 5. That is, $\varepsilon_1$(t) may comprise drive waveforms 525. $\varepsilon_2$ (t) may be applied, in some embodiments, to cavity 540 in the implementation of FIG. 5 to detect (and in some cases, correct) photon error detected via the implementation of FIG. 5 as discussed above. That is, $\varepsilon_2$ (t) may comprise drive waveforms 545. In some embodiments, $\varepsilon_2$ (t) may be applied to Josephson junction 944 in the implementation of FIG. 9 to autonomously correct for photon losses. That is, $\varepsilon_2$ (t) may comprise drive waveforms 948. It will be appreciated that, in the example of FIG. 10, drive waveforms $\varepsilon_1$ (t) and $\varepsilon_2$ (t) may each include any number of energy pulses having any suitable frequencies and may be directed to the same, or different portions of mixing circuit 220 or error syndrome detection circuit 240.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, some embodiments may be implemented, at least in part, using hardware, software or a combination thereof. When implemented at least in part in software, the software code can be executed on any suitable processor or collection of processors (e.g., controller 1040 in FIG. 10, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system comprising:
   a circuit quantum electrodynamics system that includes:
      a logical qubit comprising first and second quantum mechanical oscillators;
      a mixing circuit coupled to each of the first and second quantum mechanical oscillators; and
      a quantum error syndrome detection circuit coupled to each of the first and second quantum mechanical oscillators;
   at least one controller; and
   at least one computer readable medium storing instructions that, when executed by the at least one controller, perform a method comprising:
      applying, using the at least one controller, a plurality of drive waveforms to the mixing circuit, the plurality of drive waveforms having different frequencies; and
      concurrent with said application of the plurality of drive waveforms, detecting, by the quantum error syndrome detection circuit, a change in energy state of the logical qubit.

2. The system of claim 1, wherein the plurality of drive waveforms are configured to drive a dissipation of energy from the first and second quantum mechanical oscillators to the mixing circuit.

3. The system of claim 1, wherein the mixing circuit is coupled to the first and second quantum mechanical oscillators via a first Josephson junction.

4. The system of claim 3, wherein the plurality of drive waveforms are configured to produce an exchange of energy between the first and second quantum mechanical oscillators and the first Josephson junction.

5. The system of claim 4, wherein said exchange of energy is configured to passively protect against dephasing errors of the logical qubit.

6. The system of claim 1, wherein the first and second quantum mechanical oscillators exhibit different resonant frequencies.

7. The system of claim 1, wherein the first and second quantum mechanical oscillators each comprise a microwave cavity.

8. The system of claim 1, wherein the quantum error syndrome detection circuit comprises a fourth quantum mechanical oscillator independently coupled to each of the first and second quantum mechanical oscillators.

9. The system of claim 8, wherein the quantum error syndrome detection circuit further comprises second and third Josephson junctions, wherein the fourth quantum mechanical oscillator is coupled to the first quantum mechanical oscillator via the second Josephson junction, and wherein the fourth quantum mechanical oscillator is coupled to the second quantum mechanical oscillator via the third Josephson junction.

10. The system of claim 9, wherein the instructions are further configured to, when executed by the at least one controller, apply first and second pumps to the second and third Josephson junctions, respectively.

11. The system of claim 10, wherein the instructions are further configured to, when executed by the at least one controller, detect an energy displacement of the fourth quantum mechanical oscillator caused by application of the first and second pumps, wherein said energy displacement is indicative of the change in the energy state of the logical qubit.

12. The system of claim 1, wherein the quantum error syndrome detection circuit comprises a fourth Josephson junction coupled to each of the first and second quantum mechanical oscillators.

13. The system of claim 12, wherein the change in the energy state of the logical qubit is implicitly detected via application of one or more drive waveforms to the first quantum mechanical oscillator that produce a change in the energy state of the first quantum mechanical oscillator which is dependent upon a state of the fourth Josephson junction.

14. A method of performing quantum error correction within a circuit quantum electrodynamics system that includes a logical qubit comprising first and second quantum mechanical oscillators, a mixing circuit coupled to each of the first and second quantum mechanical oscillators; and quantum error syndrome detection circuit coupled to each of the first and second quantum mechanical oscillators, the method comprising:

applying, using at least one controller, a plurality of drive waveforms to the mixing circuit, the plurality of drive waveforms having different frequencies; and concurrent with said application of the plurality of drive waveforms, detecting, by the quantum error syndrome detection circuit, a change in energy state of the logical qubit.

15. The method of claim 14, wherein the plurality of drive waveforms drive a dissipation of energy from the first and second quantum mechanical oscillators to the mixing circuit.

16. The method of claim 14, wherein the plurality of drive waveforms produce an exchange of energy between the first and second quantum mechanical oscillators and a first Josephson junction, and wherein the mixing circuit is coupled to the first and second quantum mechanical oscillators via the first Josephson junction.

17. A circuit quantum electrodynamics system comprising:

a physical qubit;

a logical qubit comprising a first bosonic system and a second bosonic system, the first and second bosonic systems being coupled to the physical qubit;

a controller configured to encode, during operation of the circuit quantum electrodynamics system, a state of the physical qubit in a state of the logical qubit, the encoded state being a multi-component coherent state of the first and second bosonic systems; and an error syndrome detector coupled to the logical qubit and configured to detect an error in said state of the logical qubit based on one or more quantum non-destructive measurements of a boson number difference between the first and second bosonic systems.

18. The circuit quantum electrodynamics system of claim 17, wherein the error syndrome detector comprises a third bosonic system independently coupled to each of the first and second bosonic systems.

19. The circuit quantum electrodynamics system of claim 18, wherein the error syndrome detector further comprises second and third Josephson junctions, wherein the third bosonic system is coupled to the first bosonic system via the second Josephson junction, and wherein the third bosonic system is coupled to the second bosonic system via the third Josephson junction.

20. The circuit quantum electrodynamics system of claim 18, wherein the error syndrome detector is further configured to detect an energy displacement of the third bosonic system caused by application of energy to the third bosonic system, wherein said energy displacement is indicative of the boson number difference between the first and second bosonic systems.

* * * * *